(12) United States Patent
Shearer

(10) Patent No.: US 8,089,481 B2
(45) Date of Patent: Jan. 3, 2012

(54) UPDATING FRAME DIVISIONS BASED ON RAY TRACING IMAGE PROCESSING SYSTEM PERFORMANCE

(75) Inventor: Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 11/536,179

(22) Filed: Sep. 28, 2006

(65) Prior Publication Data

US 2008/0079734 A1    Apr. 3, 2008

(51) Int. Cl.
  *G06T 15/50* (2011.01)
(52) U.S. Cl. .......................... 345/426; 345/419; 345/505
(58) Field of Classification Search .................. 345/421, 345/426, 505
  See application file for complete search history.

(56) References Cited

U.S. PATENT DOCUMENTS

| | | | |
|---|---|---|---|
| 2005/0041031 A1* | 2/2005 | Diard ............................ | 345/505 |
| 2007/0182732 A1* | 8/2007 | Woop et al. .................... | 345/420 |

FOREIGN PATENT DOCUMENTS

WO    WO 2005078665 A1  *  8/2005

OTHER PUBLICATIONS

Reinhard, Erik. Scheduling and Data Management for Parallel Ray Tracing. Thesis. University of Bristol, 1999.*
Salmon, John, and Jeff Goldsmith. "A Hypercube Ray-Tracer." C3P Proceedings of the Third Conference on Hypercube Concurrent Computers and Applications 2 (1988): 1194-206.*
Badouel, Didier, Kadi Bouatouch, and Thierry Priol. "Distributing Data and Control for Ray Tracing in Parallel." IEEE Computer Graphics and Applications 14.4 (Jul. 1994): 69-77.*
Kim, Hyun-Joon, and Chong-Min Kyung. "A New Parallel Ray-Tracing System Based on Object Decomposition." Visual Computer 12.5 (1996): 244-53.*

* cited by examiner

*Primary Examiner* — Joni Hsu
*Assistant Examiner* — Scott E Sonners
(74) *Attorney, Agent, or Firm* — Patterson & Sheridan, LLP

(57) ABSTRACT

An image processing system may perform various tasks in an effort to evenly distribute workload amongst workload managers. According to one embodiment of the invention, the image processing system may divide a frame of pixels into different regions and assign responsibility for the regions to different workload managers in order to evenly distribute workload. The workload managers may be responsible for performing operations relating to determining or maintaining the color of the pixel within the region or regions which they are responsible. According to another embodiment of the invention, the image processing system may re-divide the frame into new regions based on relative workloads experienced by the processing elements to evenly distribute workload. Furthermore, according to another embodiment of the invention, the image processing system may re-partition a spatial index based on relative workloads experienced by the processing elements to evenly distribute workload amongst workload managers.

25 Claims, 19 Drawing Sheets

UPDATING FRAME DIVISIONS BASED ON RAY TRACING IMAGE PROCESSING SYSTEM PERFORMANCE

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of distributing workload in a ray tracing image processing system is provided. The method generally comprising: dividing a frame of pixels into at least a first region of pixels and a second region of pixels; assigning the responsibility for initiating ray tracing for rays which traverse through the first region of pixels to a first processing element; assigning the responsibility for initiating ray tracing for rays which traverse through the second region of pixels to a second processing element; performing ray tracing with the first processing element and the second processing element to determine colors of pixels in the frame of pixels; monitoring at least a workload experienced by the first processing element or a workload experienced by the second processing element; and re-dividing the frame of pixels into at least a new first region of pixels and a new second region of pixels.

According to another embodiment of the invention a computer readable medium containing a program which, when executed, performs operations is provided. The operations generally comprising: dividing a frame of pixels into at least a first region of pixels and a second region of pixels; assigning the responsibility for initiating ray tracing for rays which traverse through the first region of pixels to a first processing element; assigning the responsibility for initiating ray tracing for rays which traverse through the second region of pixels to a second processing element; performing ray tracing with the first processing element and the second processing element to determine colors of pixels in the frame of pixels; monitoring at least a workload experienced by the first processing element or a workload experienced by the second processing element; re-dividing the frame of pixels into at least a new first region of pixels and a new second region of pixels; assigning responsibility for initiating ray tracing for rays which traverse through the new first region of pixels to the first processing element; and assigning responsibility for initiating ray tracing for rays which traverse through the new second region of pixels to the second processing element.

According to another embodiment of the invention an image processing system is provided. The image processing system generally comprising: a first processing element; and a second processing element, wherein the image processing system is configured to divide a frame of pixels into at least a first region of pixels and a second region of pixels; assign the responsibility for initiating ray tracing for rays which traverse through the first region of pixels to a first processing element; assign the responsibility for initiating ray tracing for rays which traverse through the second region of pixels to a second processing element; perform ray tracing with the first processing element and the second processing element to determine colors of pixels in the frame of pixels; monitor at least a workload experienced by the first processing element or a workload experienced by the second processing element; and re-divide the frame of pixels into at least a new first region of pixels and a new second region of pixels.

DETAILED DESCRIPTION OF THE PREFERRED EMBODIMENTS

Figure 1:
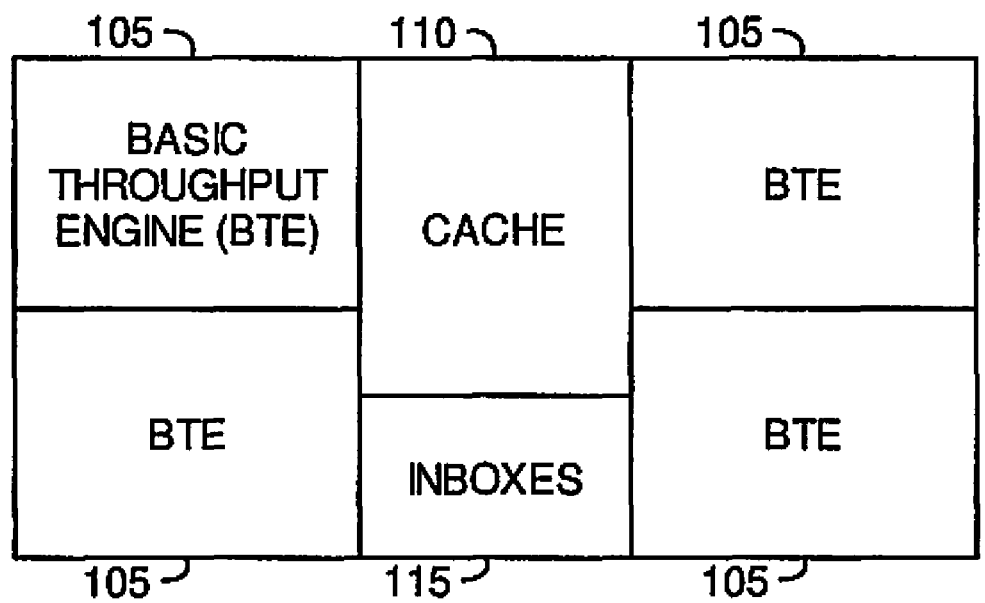
FIG. 1 illustrates a multiple core processing element, according to one embodiment of the invention.

Embodiments of the invention provide systems and methods for distributing workload in a ray tracing image processing system. Evenly distributed workload in a ray tracing image processing system may result in faster and more efficient image processing.

Some embodiments of the invention may evenly distribute workload by dividing a frame of pixels to be rendered into a plurality of regions, and assigning responsibility for each region to different processing elements. Each processing element may be responsible for performing a multitude of tasks for the pixels within their corresponding region, and these tasks may ultimately result in determining the color of those pixels. Furthermore, processing elements may be assigned responsibility to the regions of the frame based on the portions of a spatial index which they are responsible for traversing rays through.

Some embodiments of the invention may re-distribute workload amongst processing elements by re-dividing the frame into new regions based on relative workloads experienced by the processing elements. By re-dividing the frame, processing elements which may have been experiencing a relatively high workload may be responsible for a smaller region of the frame than before, and processing elements which may have been experiencing a relatively low workload may be responsible for a larger region of the frame than before.

Furthermore, some embodiments of the invention may re-distribute workload amongst processing elements by re-partitioning a spatial index based on relative workloads experienced by the processing elements. By re-partitioning the spatial index based on workloads experienced by the processing elements, processing elements which may have been experiencing a relatively high workload may be responsible for traversing rays through a smaller portion of the spatial index than before, and processing elements which may have been experiencing a relatively low workload may be responsible for traversing rays through a larger portion of the spatial index than before.

The operations performed according to embodiments of the invention and described herein (e.g., dividing a frame of pixels into a plurality or regions, re-dividing the frame of pixels based on relative workloads experienced by processing elements, re-partitioning a spatial index based on workloads experienced by processing elements, etc.) may be performed by various hardware or software components within an image processing system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
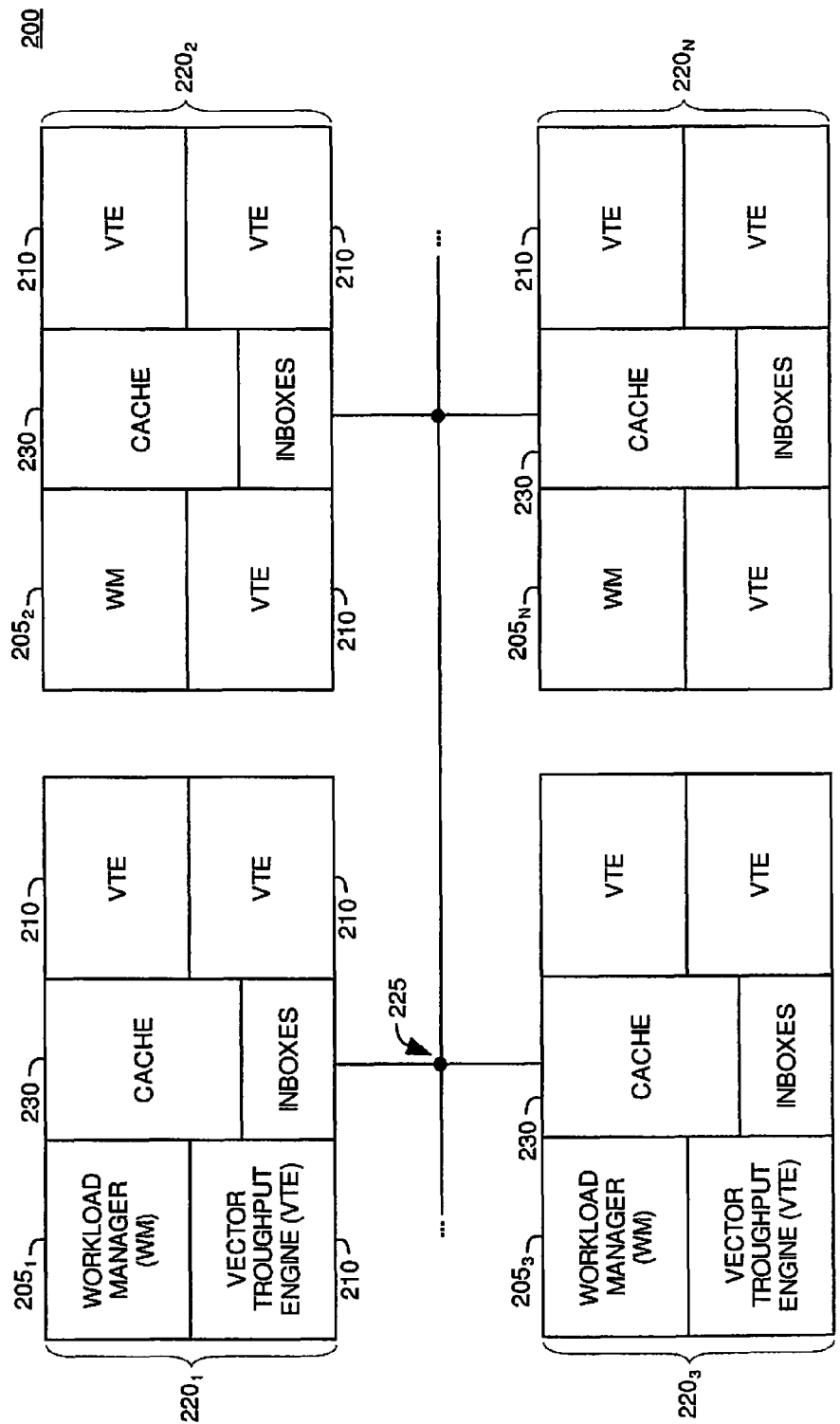
FIGS. 2 and 6 illustrate multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
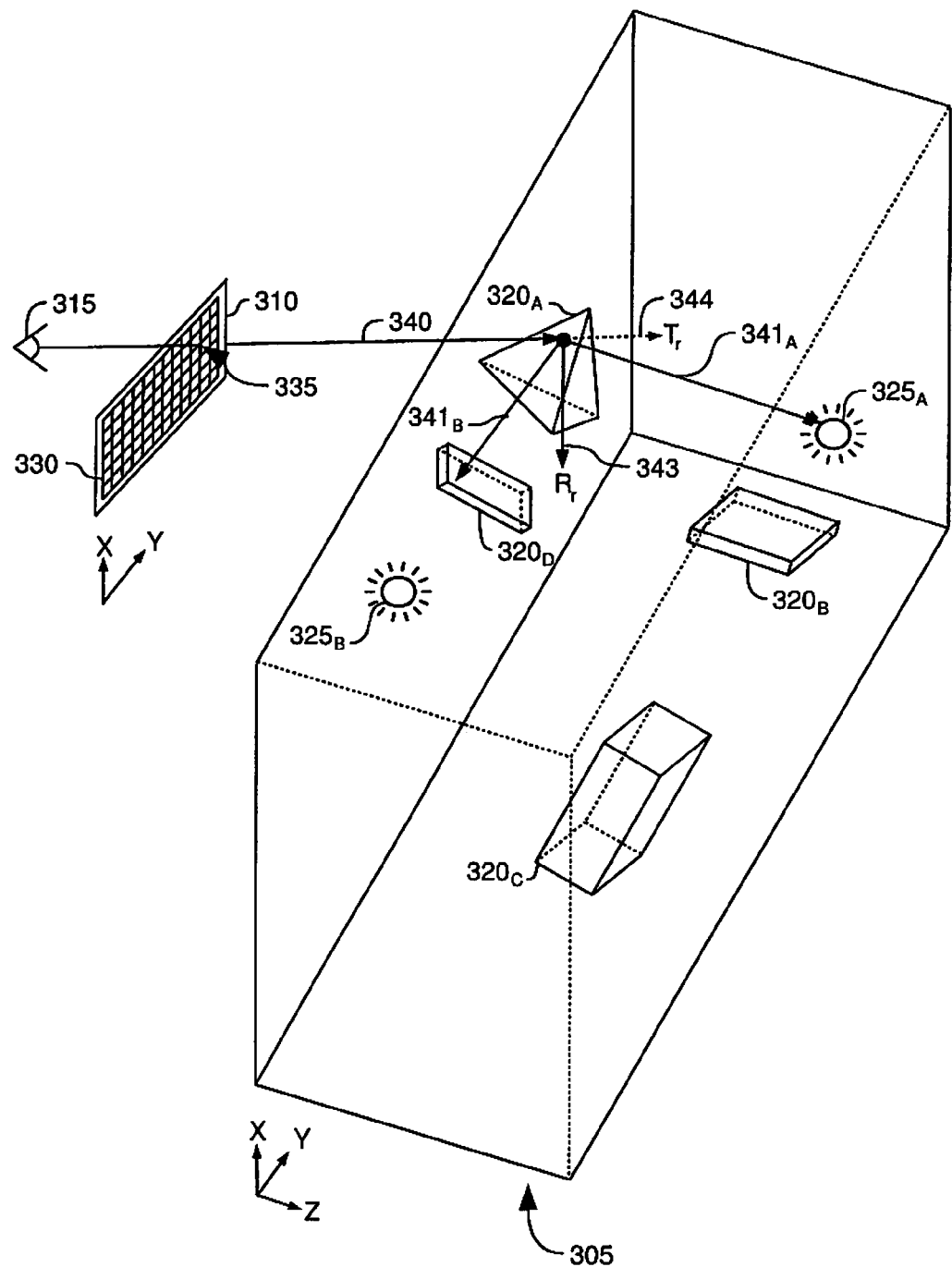
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 305. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid or a frame 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
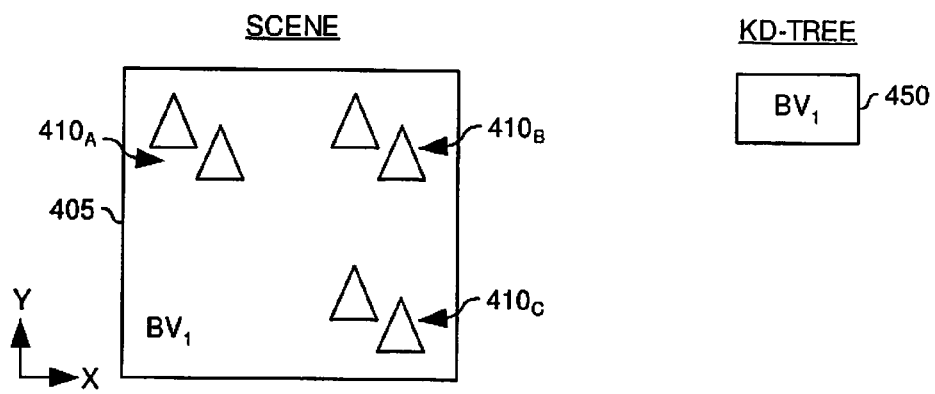
FIGS. 4A-4C illustrate a two dimensional space to be rendered by an image processing system and a corresponding spatial index created by an image processing system, according to one embodiment of the invention.
Figure 4B:
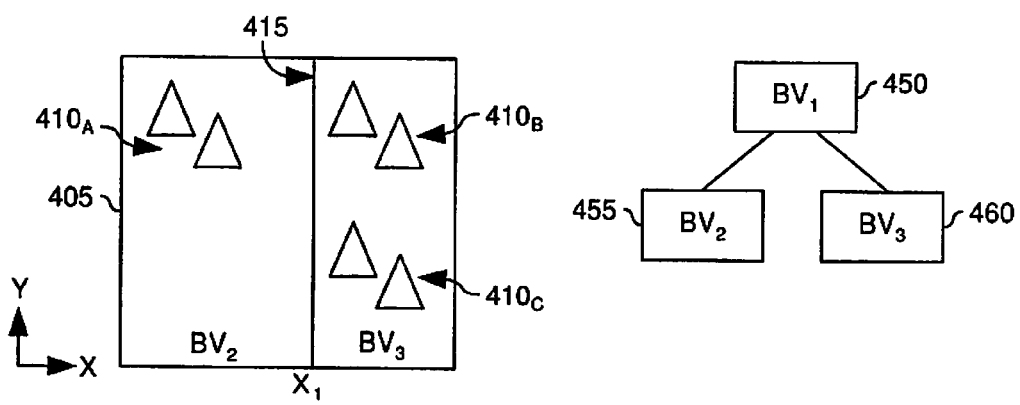
Figure 4C:
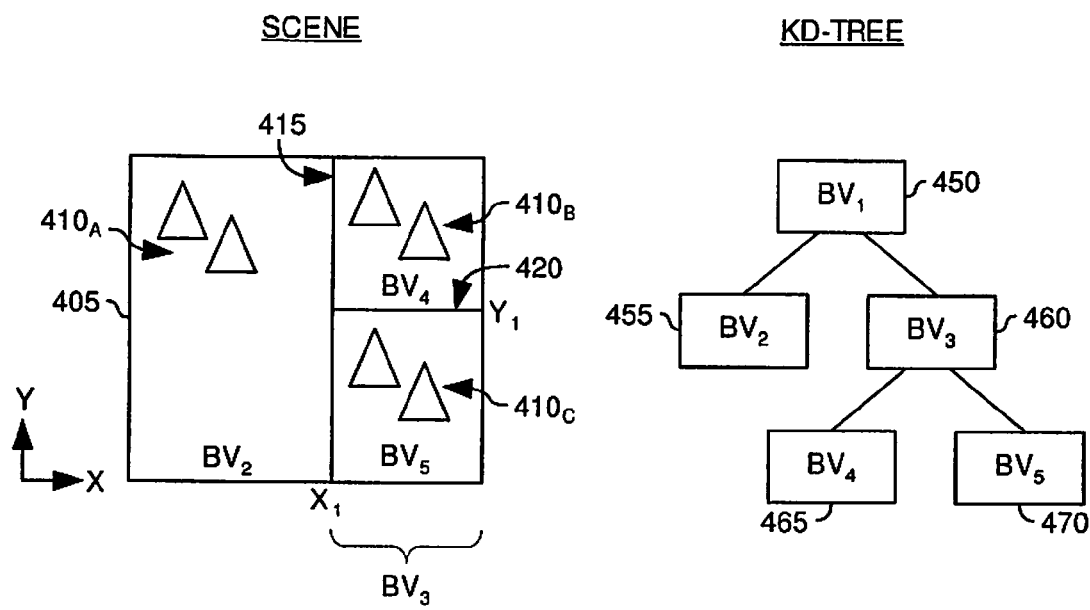

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$ was accomplished by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node BV$_4$ may contain pointers to primitives 410$_B$ and leaf node BV$_5$ may contain pointers to primitives 410$_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Exemplary Spatial Index Partitions

Figure 5:
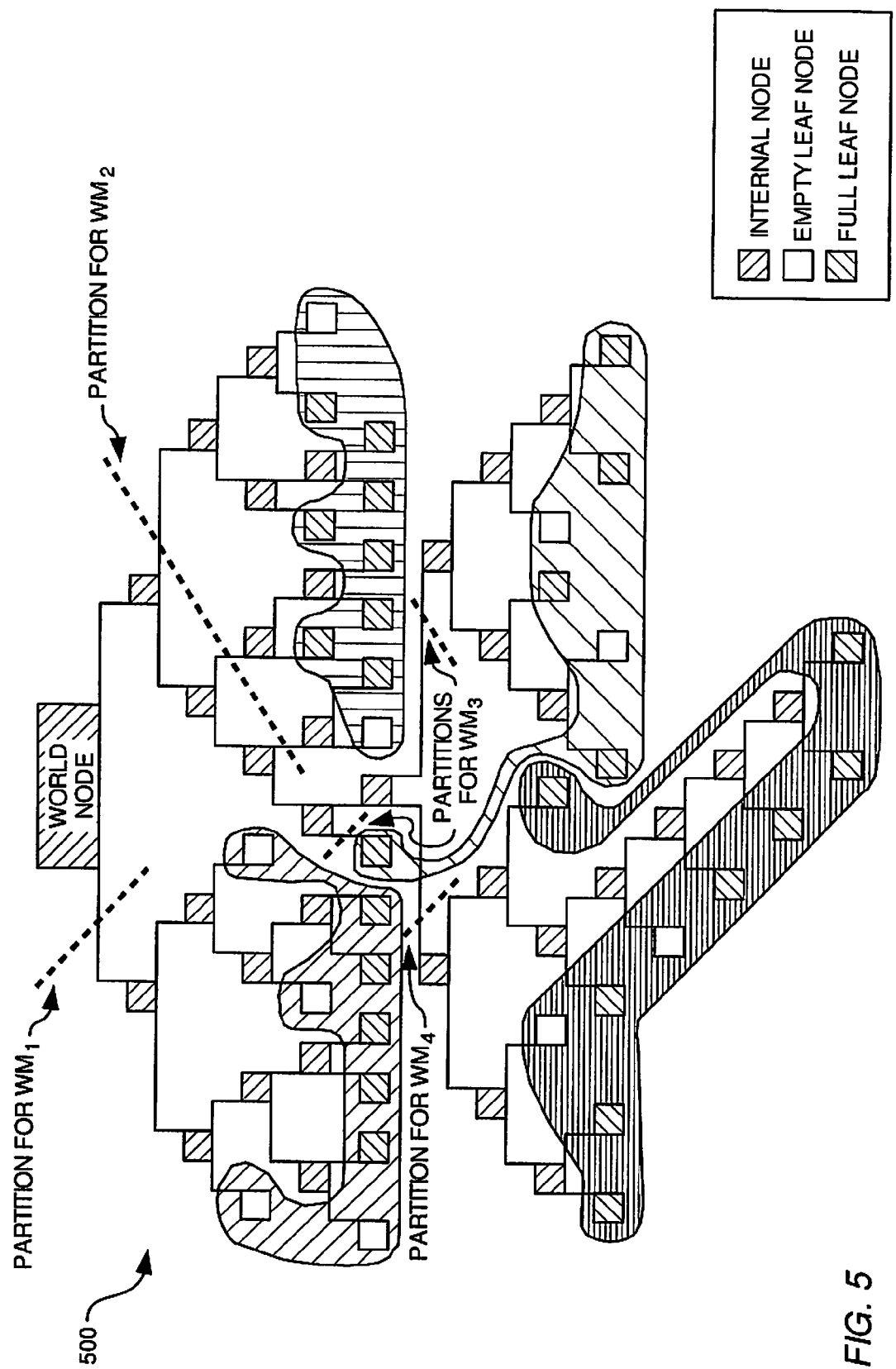
FIGS. 5, 10, 11 and 17 illustrate exemplary partitioned spatial indexes, according to one embodiment of the invention.

FIG. 5 illustrates an exemplary partitioned spatial index 500 (i.e., a kd-Tree), according to one embodiment of the invention. A spatial index may be partitioned to distribute operations related to traversing the spatial index evenly amongst multiple processing elements. The kd-tree 500 illustrated in FIG. 5 may represent a three dimensional scene to be rendered. As described above with regards to FIG. 4, a workload manager may use information defining a ray to traverse the kd-Tree. Furthermore, the workload manager may contain a plurality of processing threads and a memory cache (e.g., an L1 or L2 cache). Workload managers may traverse the kd-tree 500 by first executing ray-bounding volume intersection tests. As the ray intersects bounding volumes corresponding to the nodes, the workload manager may then traverse the kd-tree 500 by taking branches to nodes which were intersected by the ray. According to one embodiment of the invention, the workload manager may continue to execute ray bounding volume intersection tests and take branches to intersected nodes until the workload manager takes a branch to a leaf node. When the workload manager takes a branch to a leaf node, the workload manager may send the ray, for example via the inboxes 115 and/or the high speed bus 225 to a vector throughput engine for ray-primitive intersection tests.

Figure 6:
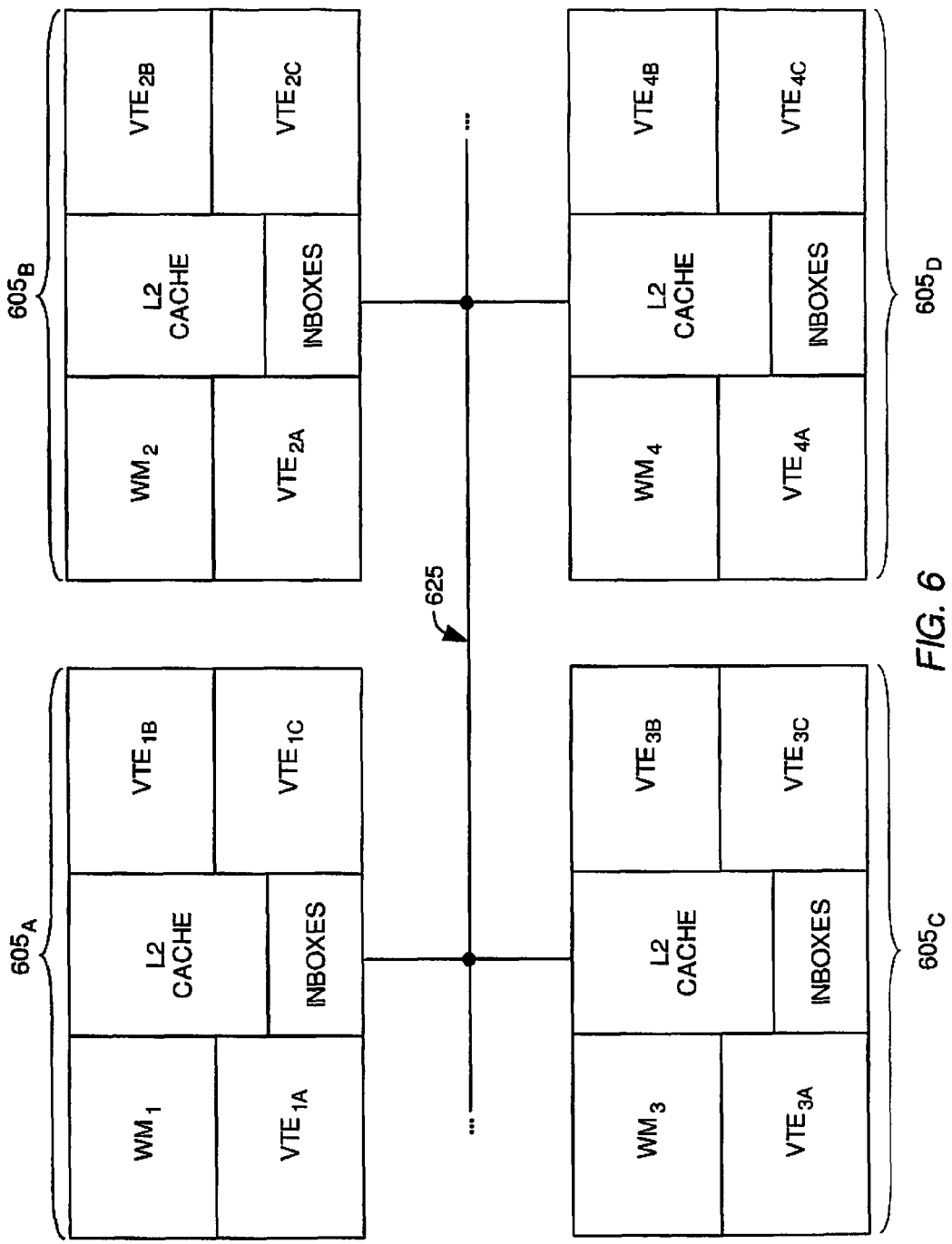

According to one embodiment of the invention, a plurality of workload managers each on separate processing cores may be used to traverse the kd-tree 500. FIG. 6 illustrates one embodiment of a plurality of workload managers each on separate processing cores. FIG. 6 illustrates four workload managers WM$_{1-4}$ on four different processing cores 605$_{A-D}$. Also present on each processing core are a plurality of vector throughput engines VTE$_{1A}$-VTE$_{4C}$, a shared cache (e.g., an L2 cache) and a plurality of memory mapped inboxes. The workload managers and vector throughput engines may communicate via the inboxes and via the high speed bus 625.

According to one embodiment of the invention, as a workload manager traversing the spatial index reaches a predefined division or partition of a spatial index, the workload manager may send the ray (e.g., send via the inboxes a pointer to information defining the ray) to a different (e.g., a second) workload manager. The second workload manager may then begin traversing the spatial index at the point in the spatial index where the first workload manager stopped and continue traversing the spatial index (i.e., by executing ray-bounding volume intersection tests and taking braches to other nodes) until the second workload manager reaches either a leaf node or another partition of the spatial index. Thus, the spatial index may be partitioned in a way that different workload managers may be responsible for traversing different portions of the spatial index.

For example, as illustrated in FIG. 5, a dashed partitioning line is drawn in the kd-tree 500 to distinguish a partition which workload manager 1 (WM1) may be responsible for traversing. This line may represent the point in which any workload manager (e.g., WM2, WM3, WM4, etc.) traversing the kd-tree 500 may send information defining the ray to WM1. After a workload manager has sent the information defining the ray to WM1, WM1 may continue executing tasks relating to traversing the kd-tree 500 through the portion of the kd-tree which WM1 is responsible. Similarly, a second dashed partitioning line is illustrated as the beginning of the kd-tree 500 for which WM2 may be responsible for traversing, two dashed partition lines indicate the beginning of the kd-tree 500 for which WM3 may be responsible for traversing, and a dashed partition line indicates the beginning of the portion of the kd-tree which WM4 may be responsible for traversing.

According to one embodiment of the invention, several of the workload managers may be responsible for a common portion of the spatial index. Furthermore, each of those workload managers may also be responsible for traversing a portion of the spatial index which no other workload manager is responsible for traversing. For example, as illustrated in FIG. 5 by the dashed lines, the kd-tree 500 may be divided into multiple portions. Each workload manager may be responsible for traversing a portion of the kd-tree 500 below their corresponding dashed partitioning lines. Furthermore, each workload manager may be responsible for traversing the portion of the kd-tree 500 which is above all dashed partitioning lines (i.e., a portion of the kd-Tree 500 which includes the world node). Thus, as the image processing system issues rays to the workload managers for traversal through the kd-tree 500, each workload manager may begin the traversal of the ray at the world node and continue traversing the spatial index until either a leaf node is reached or a boundary indicating another workload manager is responsible for that portion of the kd-tree 500 is reached.

By having each workload manager responsible for a common portion of the spatial index which includes the world node, the image processing system may simultaneously issue a plurality of rays into the three dimensional scene. This may be accomplished by simultaneously commencing (at the world node) the traversal of a plurality of rays through the spatial index at a plurality of workload managers. A highly parallelizable system such as this may reduce the time necessary for an image processing system to render a final two dimensional image from a three dimensional scene.

For example, with reference to FIG. 5, $WM_1$ may begin traversing the spatial index with a ray at the world node. After the world node, $WM_1$ may continue traversing the spatial index (i.e., by performing ray-bounding volume intersection tests and taking branches to nodes) until it crosses a boundary indicating that another workload manager is responsible for the portion of the spatial index to which $WM_1$ is trying to traverse into. For example, $WM_1$ may take a branch which crosses the dashed partitioning line for $WM_2$. At this point $WM_1$ may cease traversing the spatial index and send (e.g., via the inboxes or the high speed bus) information defining the ray and information indicating that $WM_1$ had traversed the spatial index with the ray to the point where $WM_1$ crossed the partitioning line for $WM_2$. $WM_1$ may send the information defining the ray via the inboxes 615 and the communications network 625 to $WM_2$. Next, $WM_2$ may continue traversing the kd-tree with the ray from the point $WM_1$ stopped until $WM_2$ reaches a leaf node.

According to one embodiment of the invention, the image processing system may determine how or where to partition a spatial index. The determination of how or where to partition the spatial index may be based on a single factor or several factors. According to one embodiment of the invention, the determination of where to divide the spatial index can be made based on any number of factors including, but not limited to, the number of nodes to be assigned to each workload manager, the number of primitives contained within leaf nodes to be assigned to each workload manager, or any other suitable division which may partition the spatial index.

Furthermore, according to embodiments of the invention, the spatial index may be partitioned based on performance metrics related to the use of the spatial index (e.g., actual usage of the spatial index). For example, performance metrics may define the amount of rays which are traversed through different portions of the spatial index. The performance metrics may be calculated at periodic intervals and, the spatial index may be re-partitioned based on the performance metrics collected periodic intervals. The partitioning of the spatial index based on performance metrics may result in each workload manager being assigned an unequal number of nodes.

For example, as illustrated in FIG. 5, the partitioned portions of the kd-tree have been determined based on the number of leaf nodes each workload manager will be responsible for. As illustrated by the curved shaded areas in FIG. 5, each workload manager is responsible for seven to ten leaf nodes. Thus, the determination of where to partition the kd-Tree resulted in each workload manager being responsible for approximately the same number of leaf nodes. By evenly distributing the number of nodes each workload manager in this manner, the amount of workload (i.e., calculations relating to traversing the spatial index) each workload manager is presented may be reduced.

Although the kd-Tree illustrated in FIG. 5 has seventy-one nodes, according to embodiments of the invention, the entire spatial index may have many more nodes (e.g., hundreds of thousands or millions of nodes). Furthermore, each node may require several bytes of data to be adequately defined (e.g., 8 bytes). Therefore, the entire spatial index may require a large amount of storage space.

In order to decrease the amount of time necessary to render a final image using a ray tracing image processing system, it may be desirable to cache the spatial index in an on chip cache memory (e.g., the L2 cache of the multiple core processing element $605_A$) rather than in off chip memory. However, a complex spatial index containing many nodes may require such a large amount of memory space that storing the spatial index in an on chip cache may not be feasible or efficient.

By partitioning a spatial index, it may be possible to reduce the amount of cache memory required by a workload manager to traverse the spatial index. As described above, workload managers traversing a partitioned spatial index may be responsible for traversing portions of the spatial index, and, consequently, they may not be responsible for traversing other portions of the spatial index. Thus, a workload managers (e.g., $605_A$) may only need to store in their on chip cache memory (e.g., L2 cache memory of the workload manager $605_A$) the portion or portions of the spatial index which the workload manager is responsible for traversing. Therefore, by only storing a portion of a spatial index, the amount of information needed to be stored for the workload manager to traverse the spatial index is reduced, and the amount of cache memory space necessary to store the spatial index is reduced.

Frame Division Amongst Processing Elements

As described above, an image processing system renders a two dimensional image from a three dimensional scene. As discussed above with respect to FIG. 3, an image processing system may use a grid or a frame 330 of pixels to render the final two dimensional scene 305 on the monitor 310. Each individual pixel may display a color to render a final composite two-dimensional picture representing the three dimensional scene 305 on the monitor 310. A ray tracing image processing system may issue rays (e.g., 340) into the scene to determine the color of pixels (e.g., pixel 335) within the frame 330.

A ray tracing image processing system may contain a plurality of processing elements (e.g., $220_{1-N}$) which may perform operations in order to render the two dimensional image from the three dimensional scene 305. Furthermore, the ray tracing image processing system may experience a workload associated with performing the operations relating to determining the color of the pixels within the frame 330. Even distribution of workload amongst the processing elements $220_{1-N}$ may improve the performance (e.g., time necessary to render a complete frame 330) of the image processing system. In other words, processing elements may be kept busy, thus reducing idle processing cycles. According to one embodiment of the invention, even distribution of workload may be accomplished by dividing responsibility for groups/sets of pixels in the frame 330 amongst the workload managers $205_{1-N}$ in the image processing system.

According to one embodiment of the invention, one way to divide workload amongst the workload managers $205_{1-N}$ may be to divide the number of pixels in the frame equally amongst each of the workload managers $205_{1-N}$. For example, FIG. 7 illustrates an exemplary frame 700 which has been partitioned such that four different workload managers (e.g., $WM_{1-4}$) are responsible for four different regions of the frame 700, with each region having the same number of pixels.

Figure 7:
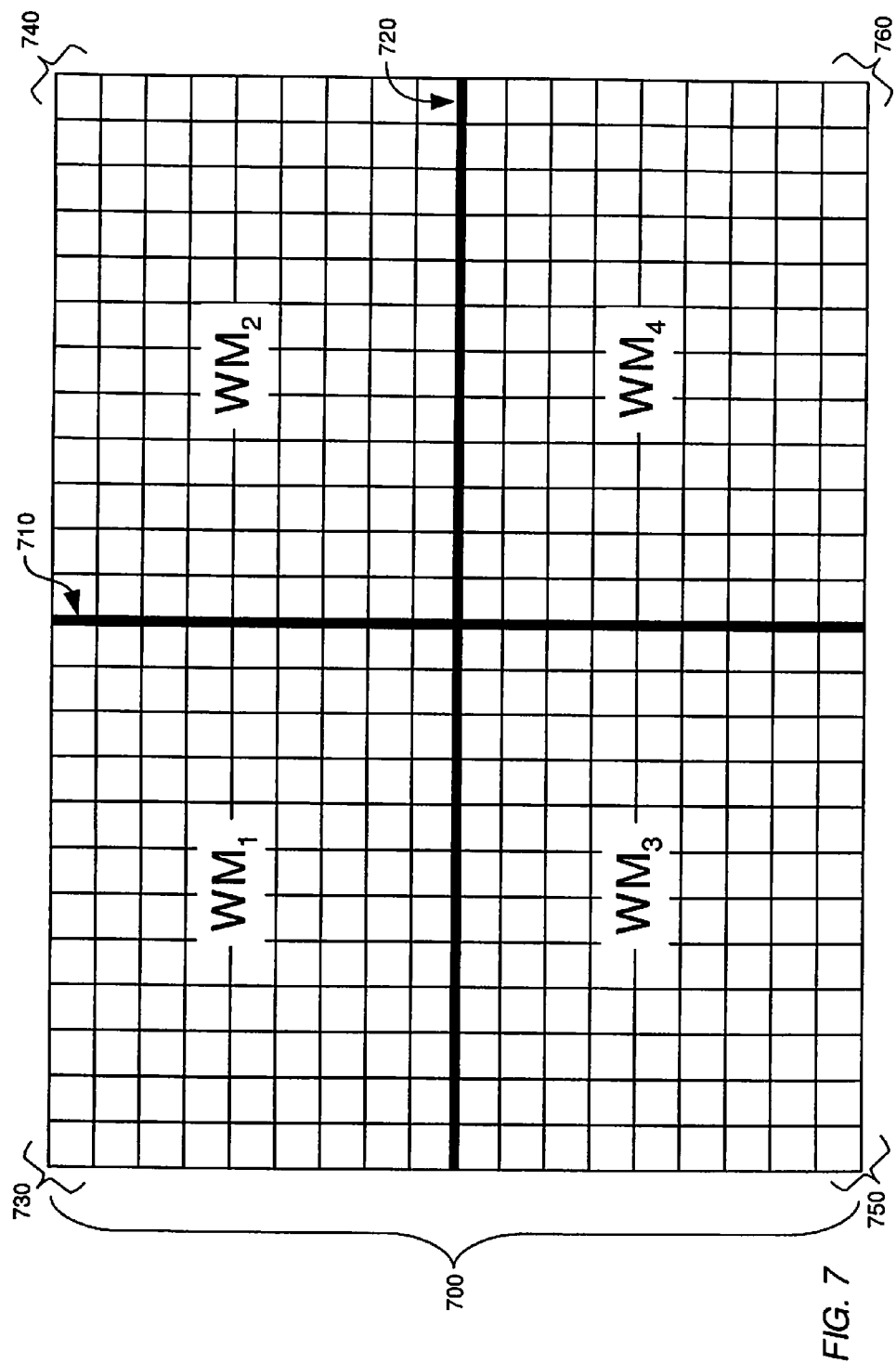
FIGS. 7, 9, 12, 14 and 15 illustrate two dimensional frames of pixels divided into regions, according to one embodiment of the invention.

The frame 700 illustrated in FIG. 7 is divided by a vertical line 710 and a horizontal line 720, resulting in four regions (i.e., an upper-left region 730, an upper-right region 740, a lower-left region 750, and a lower-right region 760). Each distinct region may be assigned to a distinct workload manager within the image processing system. The vertical line 710 and the horizontal line 720 represent the internal boundaries of the regions to be assigned to the workload managers $205_{1-N}$. However, any type of division with more complex shapes may be utilized.

Each region in FIG. 7 may contain a plurality of pixels (illustrated by the smaller squares which collectively make up the frame 700). FIG. 7 illustrates an equal division of the frame 700 between four processing elements. Although FIG. 7 illustrates only four workload managers (i.e., $WM_{1-4}$), it should be readily apparent to those skilled in the art that a different number of workload managers $205_{1-N}$ may be present in a ray tracing image processing system and in which case the division of the frame 700 may result in a different number regions which corresponds to the number of workload managers $205_{1-N}$ present in the image processing system.

According to one embodiment of the invention, each workload manager 205 may be responsible for a plurality of tasks associated with each pixel within the workload manager's 205 corresponding region of the frame. Responsibility for the pixels may include, for example, a workload manager 205 issuing rays into the scene which pass through the pixels within the region for which workload manager 205 is responsible. After issuing a ray into the scene, the workload manager 205 may traverse a spatial index 500 representing the three dimensional scene with the ray.

The workload manager 205 may also be responsible for maintaining (i.e. updating) the color of the pixels within a frame buffer. A frame buffer may be a two dimensional memory space where the color information for each pixel in the entire frame 700 may be stored. The workload manager 205 responsible for a region of pixels may have, for example, write access to areas of the frame buffer which correspond to the region of the frame for which the workload manager 205 is responsible.

Other processing elements (e.g., workload managers $205_{1-N}$ and vector throughput engines 210) may be restricted from writing to the regions of the frame buffer for which they are not responsible (e.g., they may only have read access to regions of the frame buffer for which they are not responsible). Thus, if other processing elements which have color update information for a pixel within a region of the frame 700 for which they are not responsible, the other processing elements may have to send updates (e.g., via the inboxes or the high speed bus 225) to the workload manager 205 responsible for the region of pixels in order to update the color of the pixel. Once the workload manager 205 receives a color update, it may write the color information to the corresponding location in the frame buffer.

In addition to distributing workload, by restricting write access to areas of the frame buffer to the workload manager responsible for the corresponding areas of the frame, frame buffer coherency may be achieved.

While FIG. 7 illustrates an equal division of pixels amongst the number of workload managers, other embodiments of the invention may divide the responsibility for pixels in the frame such that workload managers are responsible for an unequal number of pixels. In addition, the regions for which workload managers are responsible may change dynamically, for example, from frame to frame.

The techniques of distributing workload amongst processing elements as described herein (e.g., spatial index partitioning and frame division) may be independently implemented in an image processing system to evenly distribute workload amongst processing elements. For example, a first image processing system may distribute workload amongst processing elements using frame division. However, the same image processing system may not, for example, partition a spatial index in order to evenly distribute workload. In contrast, a second image processing system may distribute workload amongst processing through the use of spatial index partitioning, while not using frame division to distribute workload. Thus, an image processing system may implement a single technique of distributing workload and still evenly distribute workload amongst processing elements.

However, other image processing systems may distribute workload through the use of a combination of the workload distribution techniques. For example, an image processing system may distribute workload using frame division and using spatial index partitioning. Thus, an image processing system may implement a combination of embodiments of the invention and effectively distribute workload amongst processing elements. Therefore, the techniques of distributing workload amongst processing elements described herein (i.e., spatial index partitioning or frame division) may be independently implemented or collectively implemented in an image processing system in order to evenly distribute workload amongst processing elements.

Frame Region Responsibility According to a Partitioned Spatial Index

In order to reduce the amount of information sent between workload managers $205_{1-N}$, a determination of which workload manager 205 to assign to a divided region of the frame 700 may be made based on which workload manager 205 is responsible for a partition of the spatial index through which a ray issued into the assigned region of the frame 700 traverses.

As described above, a single workload manager 205 may be responsible for a single region of the frame 700. Furthermore, the workload manager 205 may issue rays into the three dimensional scene 305 which pass through the pixels within the workload manager's 205 region of the frame 700. The workload manager 205 may traverse the rays through the spatial index until a leaf node is reached or a portion of the spatial index 500 which the workload manager 205 is not responsible is reached (i.e., a partitioning line is reached). If a partitioning line is reached, the workload manager 205 may send information defining the ray to another workload manager 205 responsible for the portion of the spatial index which was traversed to.

The information defining the ray may include, for example, the trajectory of the ray, the pixel through which the ray passed, and information which defines the workload manager which issued the ray. Information which defines the workload manager which issued the ray may be included in order to identify the workload manager 205 which has write access to the region of the frame buffer corresponding to the pixel through which the ray passed. Thus, if a ray-primitive intersection test is later performed by, for example, a vector throughput engine 210, the vector throughput engine 210 may be able to determine where to send the color update if the ray strikes an object.

Increased traffic may occur when workload managers 205 tracing rays through the spatial index (e.g., the spatial index 500 illustrated in FIG. 5) frequently encounter a partition of the spatial index 500 which they are not responsible for traversing, as the workload managers send the rays to other workload managers $205_{1-N}$ when the originating workload manager 205 can no longer trace the ray through the spatial index. A workload manager 205 may no longer be able to trace a ray through a spatial index 500, because the workload manager 205 may not have the information defining the traversed to partition of the spatial index 500 in its cache and may send the ray via the inboxes and/or the high speed bus 225 to a different workload manager 205 which contains the traversed to portion of the spatial index 500 in its cache.

The time necessary to pass a ray between workload managers $205_{1-N}$ may increase the overall time necessary to render a two dimensional image from the three dimensional scene 305, and thus may reduce overall performance of the image processing system. Thus, the fewer rays that are passed between workload managers $205_{1-N}$, the better the performance of a ray tracing image processing system using a plurality of workload managers $205_{1-N}$.

Thus, for some embodiments of the invention, a ray tracing image processing system may reduce the number of rays passed between workload managers $205_{1-N}$ by intelligently assigning responsibility for regions in the divided frame 700 according to workload managers $205_{1-N}$ which may contain the portion of the spatial index 500 in their cache necessary to traverse the majority of rays issued into the region thorough the entire spatial index 500 without needing to send the ray to another workload manager 205. In other words, assignment may be made in an effort to reduce the number of partitioned reached/crossed. If the majority of rays issued by a workload manager 205 into the region of the frame 700 for which the workload manager 205 is responsible traverse through the partition of the spatial index 500 for which the workload manager 205 is responsible (i.e., is stored in the workload manager's cache) the workload manager 205 may not need to send the majority of the rays it issues to another workload manager 205 so that the rays may be traversed through the spatial index 500.

One method of determining which workload manager 205 should be assigned a particular region of the frame 700 may be to trace a set of test rays through the spatial index, determine which partitions of the spatial index 500 the test rays were traced through, and assign the divided regions of the frame 700 according to the workload managers $205_{1-N}$ responsible for the traced through partitions of the spatial index 500. The set of tests rays may be distributed throughout the regions within frame in an effort to achieve the most accurate determination as to which workload manager 205 to assign to each region.

Figure 8:
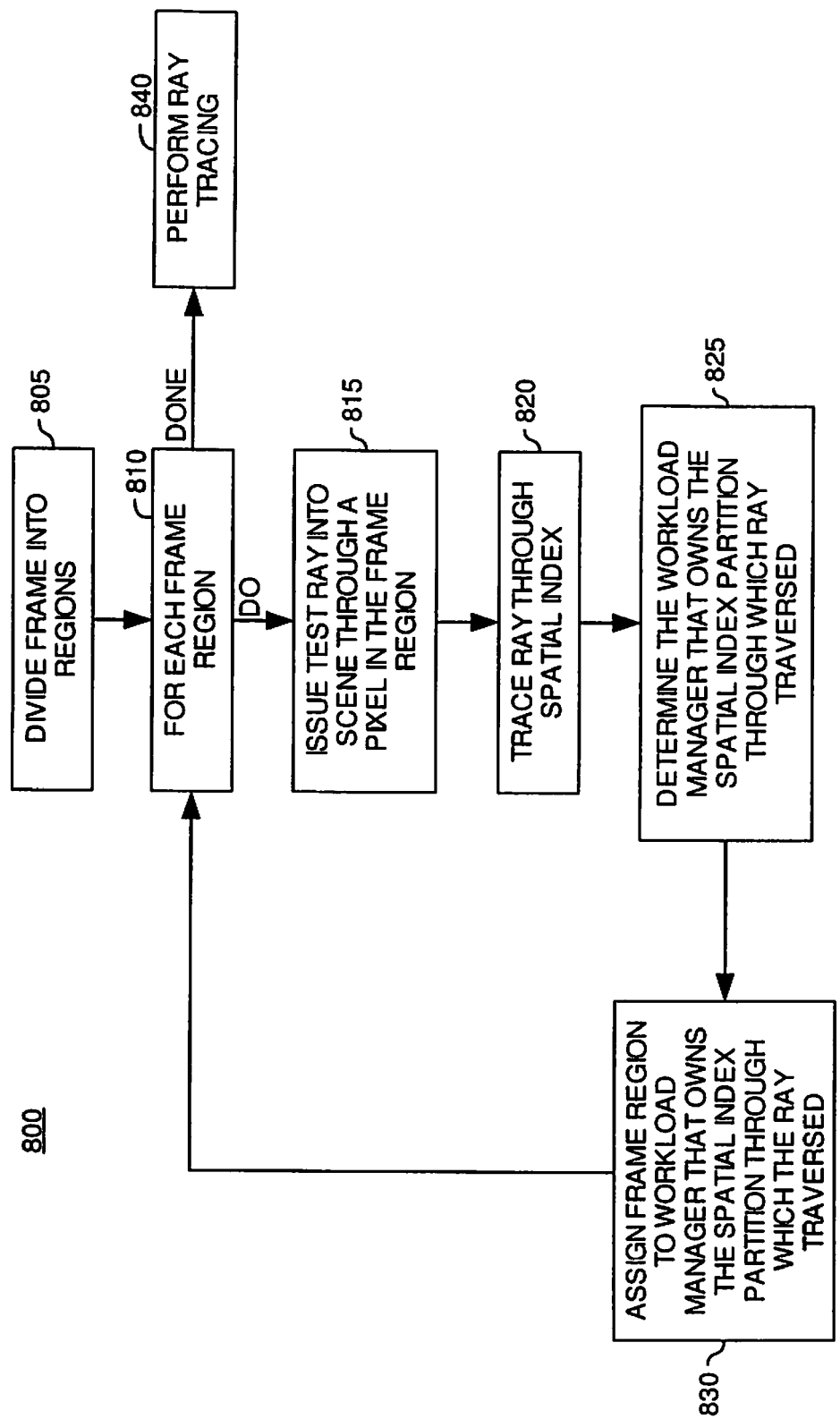
FIG. 8 is a flowchart illustrating a method of determining a workload manager which will be responsible for a region of pixels, according to one embodiment of the invention.

FIG. 8 is a flowchart illustrating a method 800 of assigning a frame region to a workload manager 205, according to one embodiment of the invention. The method 800 begins at step 805 where the image processing system may divide the frame 500 into a plurality of regions. For example, the image processing system may divide the frame 700 into equally sized regions as illustrated in FIG. 7. Furthermore, as described with respect to FIG. 7, the image processing system may divide the frame 700 into a number of regions corresponding to the number of workload managers $205_{1-N}$ in the image processing system (e.g., four).

Next, at step 810, the image processing system may enter a loop including steps to assign each region to a workload manager 205. The loop may iterate as many times as there are regions in the frame 700. Next, at step 815, the image processing system may issue a test ray into the three dimensional scene 305 through a first region of the frame 700.

Figure 9:
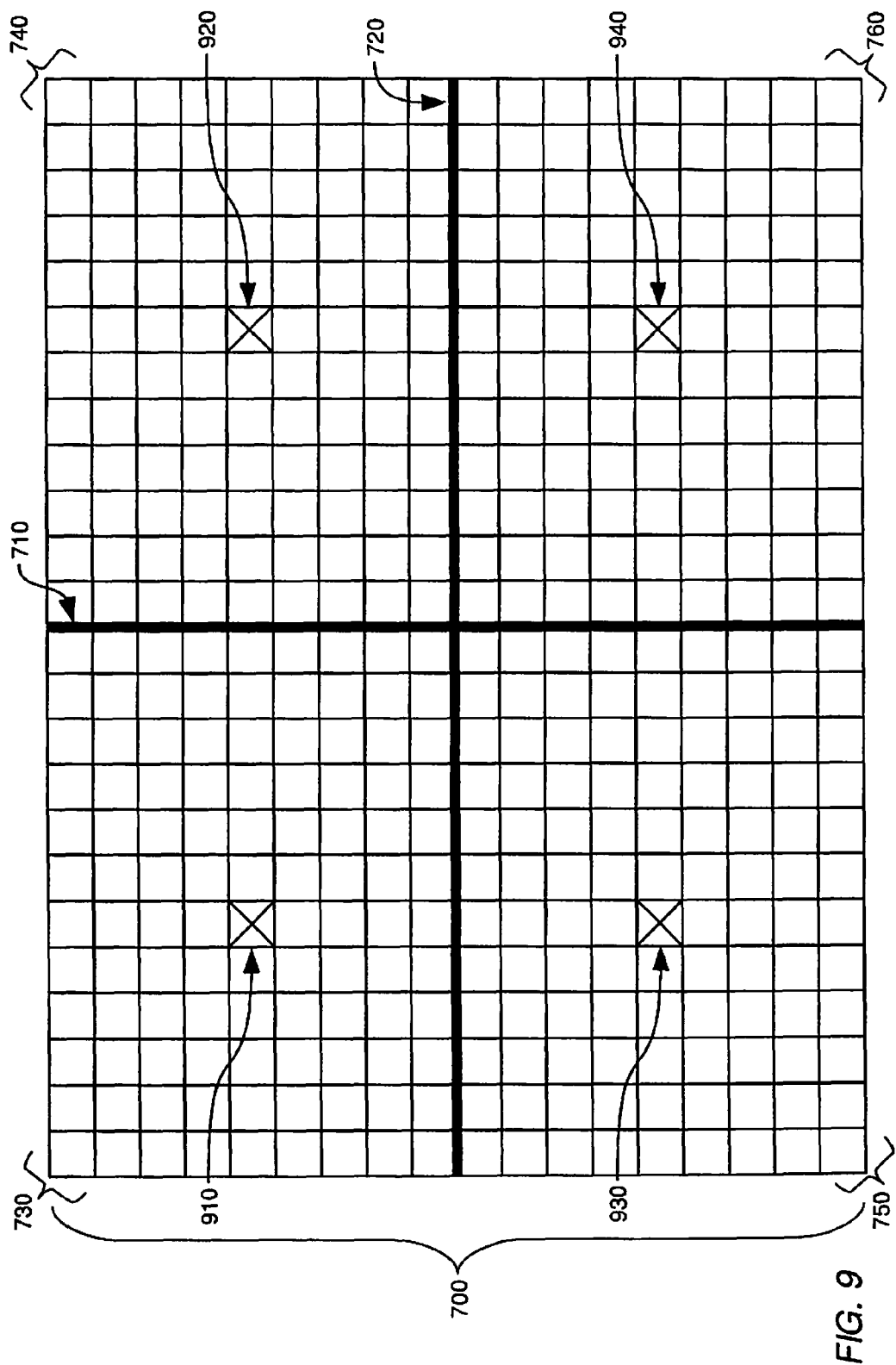

For example, as illustrated in FIG. 9, the image processing system may issue a first test ray into the three dimensional scene 305. The first test ray may pass through a pixel 910, for example, within the upper-left region 730 of the frame 700.

Next, at step 820 the image processing system (via any workload manager $205_{1-N}$) may trace the first test ray through the spatial index 500. As the first test ray is traced through the spatial index 500, the first test ray may cross a partitioning line and enter a partition of the spatial index 500 which a single workload manager 205 may be responsible.

Figure 10:
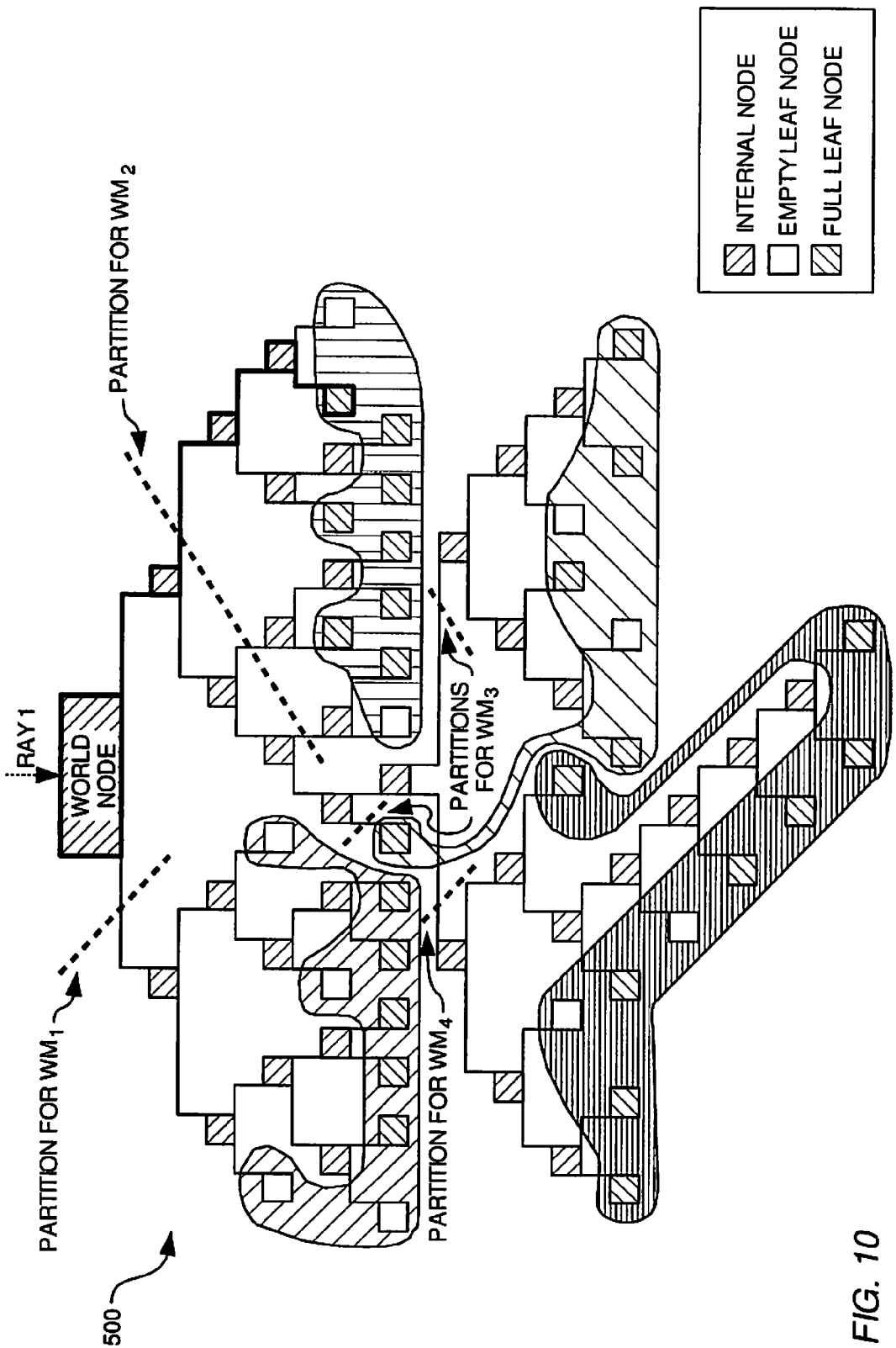

For example, as illustrated in FIG. 10, the image processing system may traverse the first ray through the spatial index 500 by executing first test ray-bounding volume intersection tests and consequently taking branches to nodes within the spatial index 500 which are intersected by the first test ray.

Either after tracing the test ray through the entire spatial index 500, or upon encountering a partitioning line, at step 825, the image processing system may determine the workload manager 205 which is responsible for traversing rays in the spatial index 500 partition which the ray was traversed to. Next, at step 830, the image processing system may assign the frame region containing the pixel through which the first test ray passed to the workload manager 205 responsible for the traversed to partition of the spatial index 500.

Figure 12:
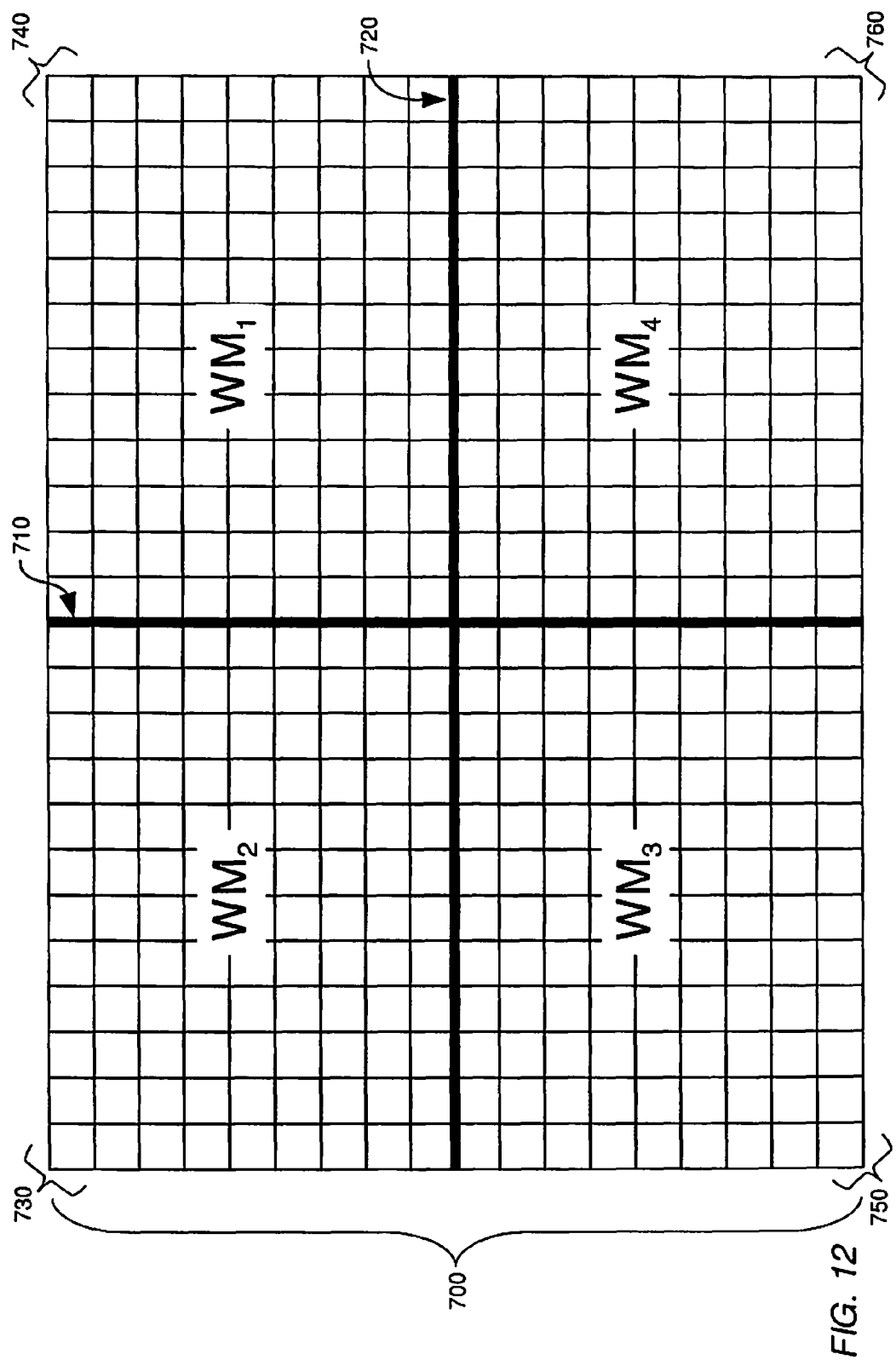

For example, as illustrated in FIG. 10, the first test ray may traverse across a partitioning line and into the partition of the spatial index 500 for which $WM_2$ is responsible. Because the first test ray traversed into the partition of the spatial index 500 which $WM_2$ was responsible, as illustrated in FIG. 12 the image processing system may assign the upper-left region 730 of the frame 700 to $WM_2$.

After assigning the region to the appropriate workload manager 205, the image processing system may proceed to step 810 where the loop may iterate another time if there are regions within the frame 700 remaining which need to be assigned to a workload manager 205.

Figure 11:
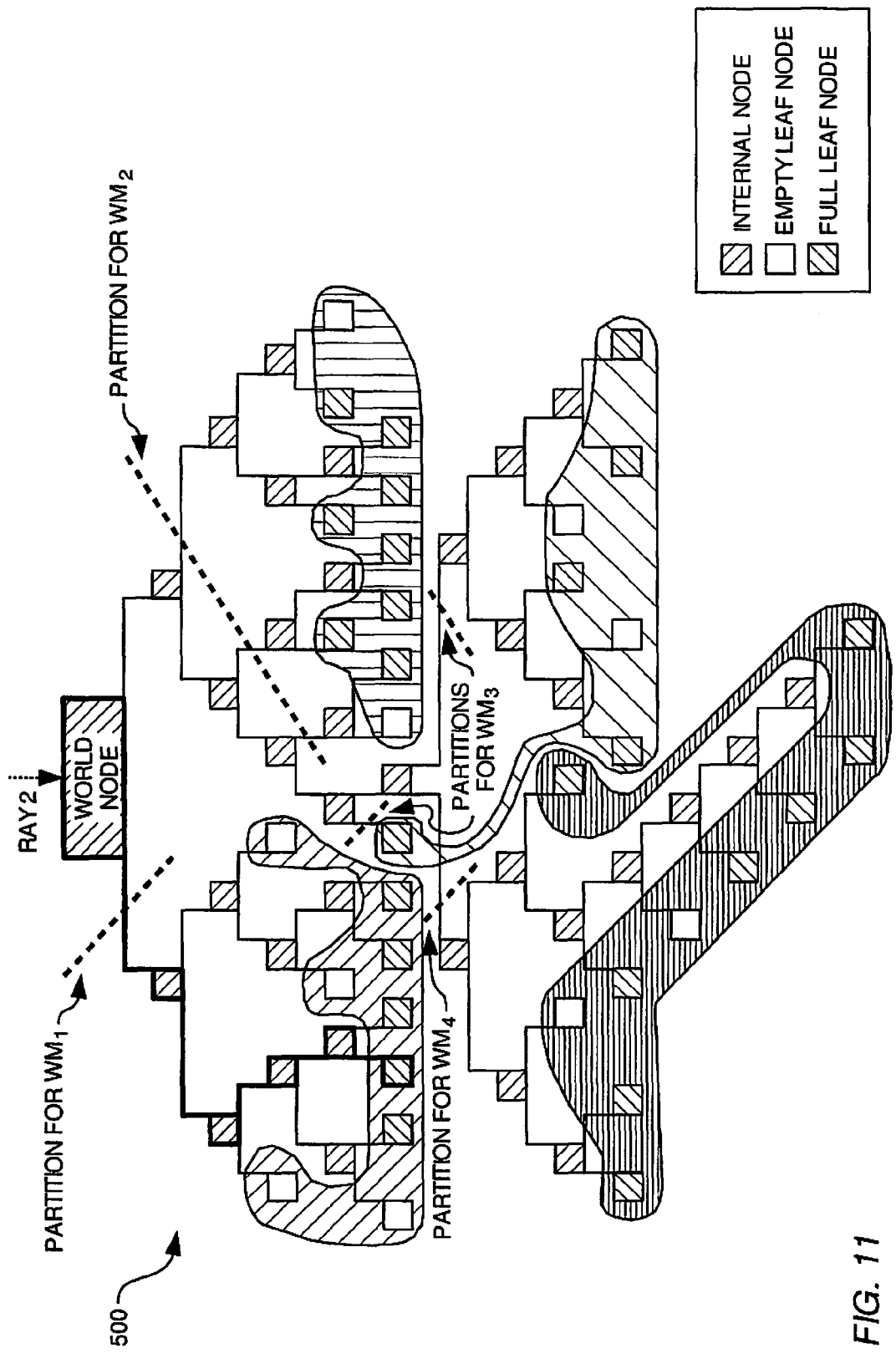

For example, the loop may iterate again with respect to FIG. 9 because there are three regions remaining. Consequently, the image processing system may issue a second test ray into the scene 305 which passes through a pixel in a different region (e.g., pixel 920 in the upper-right region 740) than the first region (i.e., the upper-left region 730). As illustrated in FIG. 11, the image processing system, using a workload manager 205, may traverse the second test ray through the spatial index 500. As described above, the second test ray may cross a partitioning line and traverse into a partition of the spatial index 500 assigned to a particular workload manager 205. As illustrated in FIG. 11, the second test ray crosses the partitioning line for $WM_1$. Consequently, the image processing system may assign responsibility for the pixels in the upper-right region 740 of the frame 700 to $WM_1$.

Furthermore, the image processing system may issue a third test ray and a fourth test ray which may pass through a third pixel 930 and a fourth pixel 940 respectively in the frame 700. By traversing the third test ray and the fourth test ray through the spatial index 500, the image processing system may determine, based on the traversed to partitions of the spatial index 500, to assign the lower-left region 750 to $WM_3$ and the lower-right region to $WM_4$ as illustrated in FIG. 12.

Once all regions of the frame 700 have been assigned to workload managers $205_{1-N}$, the image processing system may proceed to step 840. At step 840, the image processing system may perform other operations relating to ray tracing (e.g., trace other rays through the three dimensional scene 305) with the rays for each region assigned to workload managers as determined by traversing the test rays through a spatial index.

According to one embodiment of the invention, the image processing system may issue a sufficient number of test rays into the scene for each region in the frame 700 in order to determine which workload manager 205 should be assigned responsibility for the frame region. As described above, a sufficient number of rays may be, for example, a single test ray for each divided region in the frame. However, according to other embodiments of the invention, a plurality of test rays may be issued into a particular divided region before the image processing system determines which workload manager 205 may be responsible for the region.

For example, after issuing a plurality of test rays into a particular divided region of the frame 700, the image processing system may determine which workload manager 205 which was responsible for the spatial index 500 partition which was traced to the most due to the plurality of test rays issued into that particular divided region. The image processing system may then make the workload manager 205 responsible for the most traversed to spatial index 500 partition the workload manager responsible for the divided region of the frame 700. By increasing the number of test rays issued into the region and assigning the workload manager 205 responsible for the most traversed to partition of the spatial index 500 to the workload manager 205 responsible for that region of the frame, the likelihood that the remaining rays issued into that region of the frame 700 will traverse through the partition of the spatial index "owned" by the issuing workload manager 205 may be increased. Thus, the likelihood that a ray may be traversed to a partitioning line and need to be sent to a different workload manager may be reduced.

Updating Frame Regions Based on Periodic Image Processing System Performance

As described above, the frame 700 to be rendered by the image processing system may be divided into a plurality of regions. Furthermore, different workload managers $205_{1-N}$ may be responsible for different regions of the frame 700. The division of the frame 700 into different regions and assigning responsibility for the different regions to different workload managers $205_{1-N}$ may be performed in an effort to evenly distribute image processing system workload amongst the workload managers $205_{1-N}$ for a period of time. However, due to various reasons (e.g., objects within the scene 305 moving from one position to another position, etc.) over time the frame division may not evenly distribute the workload. However, in response to unevenly distributed workload the image processing system may update the division of the frame in an attempt to evenly re-distribute the workload.

Figure 13:
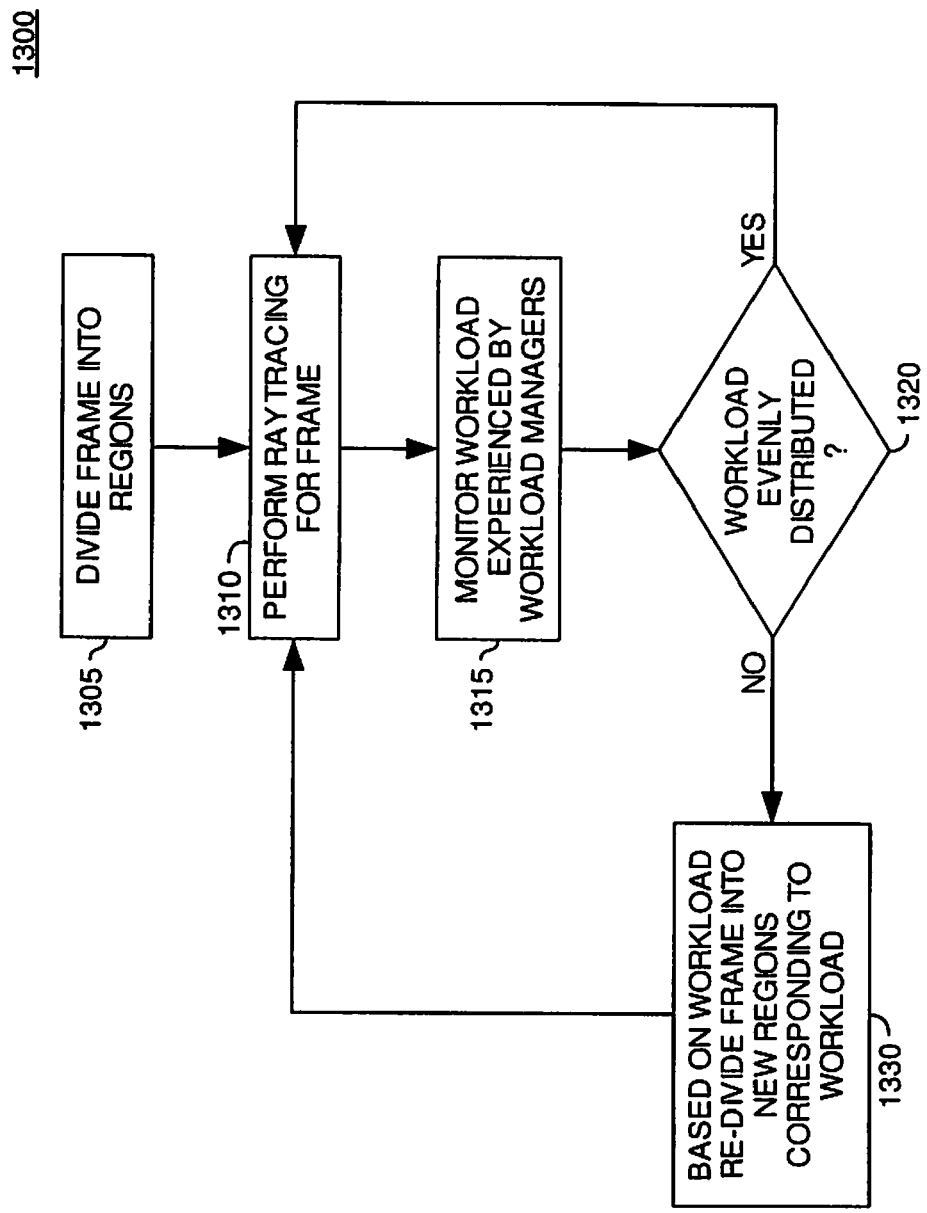
FIG. 13 is a flowchart illustrating a method of updating the division of a frame, according to one embodiment of the invention.

FIG. 13 is a flowchart illustrating a method 1300 of updating the division of a frame 700, according to one embodiment of the invention. The method 1300 begins at step 1305 where the image processing system may initially divide the frame 700 into regions and assign the regions to workload managers $205_{1-N}$, for example, using the method 800 described above.

Figure 14:
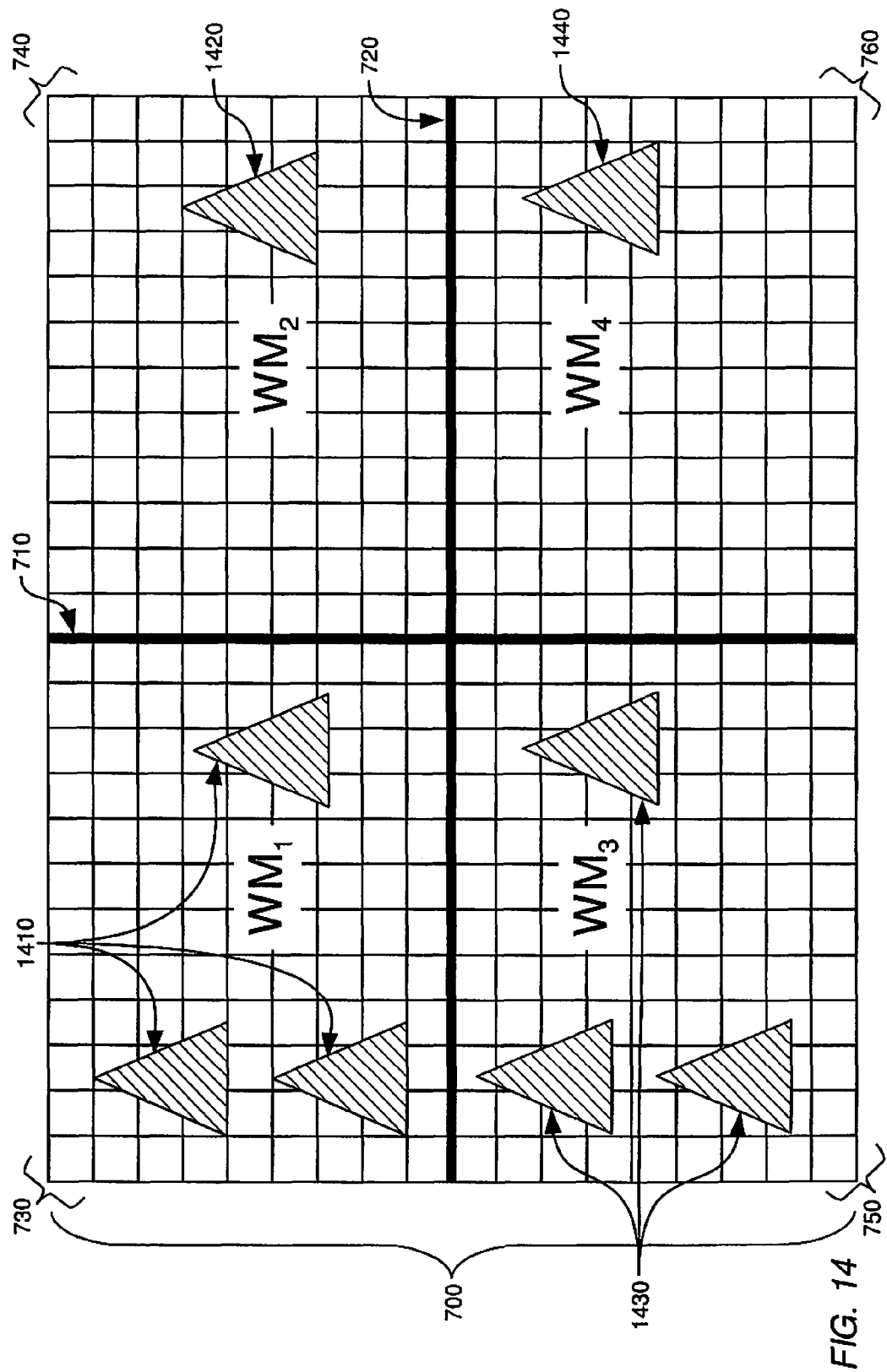

For example, FIG. 14 illustrates a frame 700 which has been divided into four regions (i.e., 730-760) and each region has been assigned a workload manager (i.e., $WM_{1-4}$).

Next, at step 1310, the image processing system may use the workload managers $205_{1-N}$ to perform ray tracing and render the current frame 700. Step 1310 is also the beginning of a loop which may iterate for each frame rendered by the image processing system, according to one embodiment of the invention. However, according to other embodiments of the invention, steps within the loop may execute according to other periods.

After rendering the frame (or during the rendering of the frame), the image processing system may monitor the workload experienced by the workload managers $205_{1-N}$ at step 1315. The image processing system may determine the workload presented to the workload managers $205_{1-N}$ by monitoring various performance parameters. For example, the workload presented to the workload managers $205_{1-N}$ may be determined by examining a performance counter for a workload manager 205. A performance counter may compile data relating to performance events within a processing element (e.g., number of reads or writes executed by a workload manager 205). The workload present to the workload managers 205 may also be determined by monitoring the traffic through the inboxes 115 corresponding to a workload manager 205. The image processing system may compare the workload experienced by the workload managers $205_{1-N}$. A high performance-counter value or a high amount of inbox traffic relative to other workload managers may indicate that a workload manager 205 is experiencing an increased workload relative to other workload managers $205_{1-N}$.

A workload manager 205 may experience an increased workload relative to other workload managers $205_{1-N}$, for example, if the region of the frame 700 for which the workload manager 205 is responsible contains more objects relative to other regions of the frame 700 for which other workload managers $205_{1-N}$ are responsible.

For example, as illustrated in FIG. 14, frame region 730 contains three objects 1410, while in contrast frame region 740 only contains one object 1420. Based on the frame division illustrated in FIG. 14, $WM_1$, which is responsible for frame region 730, may experience a larger workload in comparison to $WM_2$ which is responsible for frame region 740 because frame region 730 contains more objects. Similarly, $WM_3$, which is responsible for frame region 750, containing three objects 1430, may experience an increased workload relative to $WM_4$, which is responsible for frame region 760 containing only one object 1440.

Returning to method 1300, once the image processing system has gathered enough information through monitoring to determine the workload being experienced by each workload manager 205, the image processing system may proceed to step 1320. At step 1320, the image processing system may determine, based on the performance parameters, if the workload is distributed evenly amongst the workload mangers $205_{1-N}$. For example, if one workload manager 205 is experiencing a very high workload, but another workload manager 205 is experiencing a very low workload the image processing system may determine at step 1420 that the workload is not evenly distributed amongst the workload managers $205_{1-N}$.

As previously described, $WM_1$ and $WM_3$ are responsible for frame regions 730 and 740, respectively, in FIG. 14. Due to the number of objects 1410 and 1430 in frame regions 730 and 740, respectively, $WM_1$ and $WM_3$ may experience an increased workload in comparison to $WM_2$ and $WM_4$. Therefore, at step 1320, the image processing system may determine that the current frame division (of FIG. 14) does not result in an even distribution of workload amongst the workload managers (i.e., $WM_{1-4}$). Therefore, the image processing system may proceed to step 1330, to re-divide the frame 700 into new regions, based on the performance parameters collected in step 1315.

Figure 15:
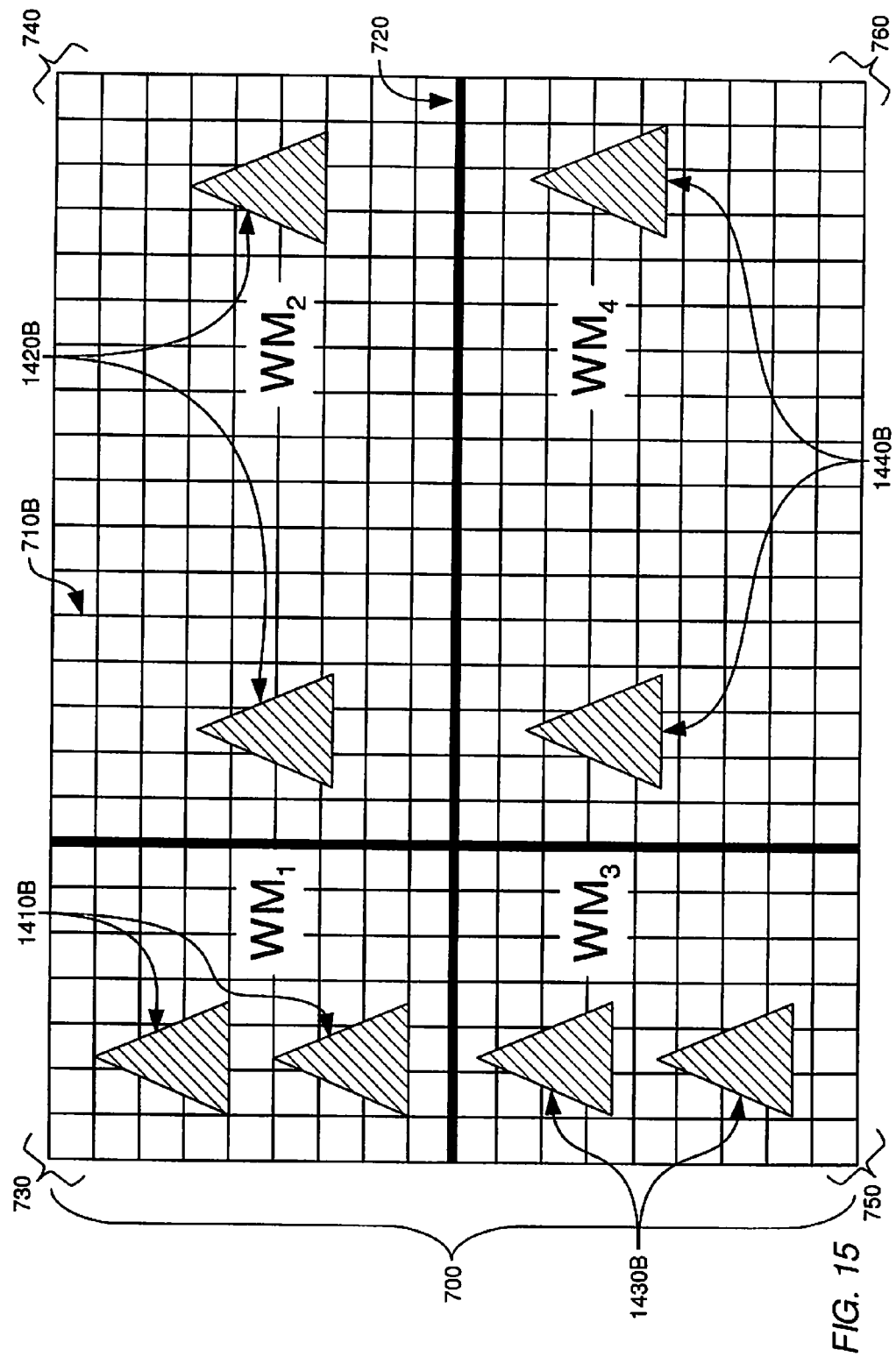

For example, the image processing system containing the workload managers and frame illustrated in FIG. 14, may divide the frame 700 into new regions based on the performance parameters collected in step 1315. The resulting new frame regions may be, for example, as illustrated in FIG. 15. The vertical line 710 which divides the frame 700 into a left side and a right side has moved from the center of the frame 700 in FIG. 14 to a new position in FIG. 15 slightly to the left of the center of the frame 700. The new vertical line 710B has decreased the size of the region of pixels for which $WM_1$ is responsible and decreased the size of the region of pixels for which $WM_3$ is responsible and increased the size of the regions for which $WM_2$ and $WM_4$ are responsible. Thus, this movement may decrease the workload presented to $WM_1$ and $WM_3$ and increase the workload presented to $WM_2$ and $WM_4$.

The new division of the frame 700 illustrated in FIG. 15 may result in a more even distribution of workload amongst the workload managers $205_{1-N}$. This may be due to the fact that the objects are more evenly distributed amongst the regions after the re-division of the frame regions. For example, as illustrated, the upper-left region 730 and the lower-left region 750 went from containing three objects each in FIG. 14 (i.e., objects 1410 and 1430 respectively) to containing only two objects each (i.e., 1410B and 1430B respectively) in the new frame regions illustrated in FIG. 15. Furthermore, the upper-right region 740 and the lower-right region 760 went from containing one object each in FIG. 14 (i.e., objects 1420 and 1440 respectively) to containing two objects each (i.e., 1420B and 1440B respectively) in the new frame regions illustrated in FIG. 15. The now even distribution of objects within the frame regions may result in a more evenly distributed workload in the image processing system.

After the frame has been divided into new regions, the image processing system may return to step 1310 where the image processing system may perform ray tracing with the newly divided frame 700 in order to render a new two dimensional image from the three dimensional scene. If however, at step 1320, the image processing system determined that the workload was evenly distributed based on the current frame division, the image processing system may retain the current frame division and return to step 1310 where the image processing system may again perform ray tracing.

According to embodiments of the invention, the reallocation of frame regions may occur periodically, for example, as described in method 1300 the period may be from frame to frame. However, according to other embodiments of the invention, the reallocation of frame regions may occur according to other periods of time. For example, by monitoring workload distribution for a given period of time or a given number of frames before reallocating or re-dividing frame regions.

Updating Spatial Index Partitioning Based on Periodic Image Processing System Performance As described above with regards to FIG. 5, an image processing system may attempt to distribute workload amongst the workload managers 205$_{1-N}$ present in the image processing system by partitioning the spatial index 500. For example, as illustrated in FIG. 5, after partitioning the spatial index, a workload manager 205 may be responsible for traversing rays through a partition of the spatial index 500. The partitioning of the spatial index 500 may be designed in an effort to evenly distribute workload over a period of time. However, due to various reasons (e.g., objects within the scene 305 moving from one position to another position, etc.) over time the partitioning of the spatial index 500 may not evenly distribute workload amongst the workload managers 205$_{1-N}$ in the image processing system. According to one embodiment of the invention, in response to the uneven workload distribution, the image processing system may re-partition the spatial index 500 to evenly redistribute the workload.

Figure 16:
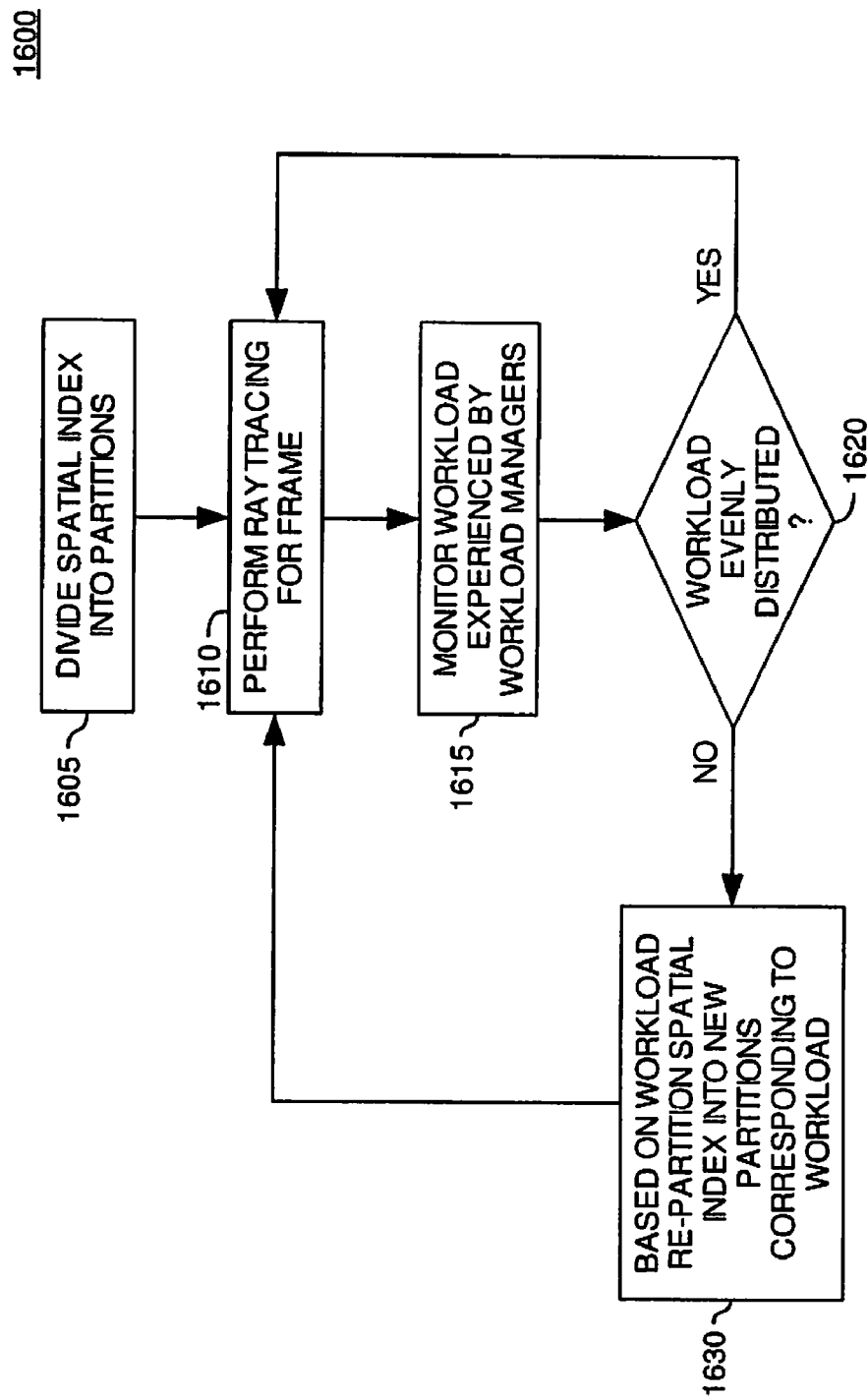
FIG. 16 is a flowchart illustrating a method of re-partitioning a spatial index, according to one embodiment of the invention.

FIG. 16 is a flowchart illustrating a method 1600 of re-partitioning a spatial index (e.g., the spatial index 500 of FIG. 5), according to one embodiment of the invention. The method 1600 begins at step 1605 where the image processing system may partition the spatial index 500 and assign the partitions of the spatial index 500 to various workload managers 205$_{1-N}$ in the image processing system. For example, FIG. 5 illustrates an exemplary partitioned spatial index 500.

After partitioning the spatial index 500 and assigning the responsibility for traversing rays through the partitions to the different workload managers 205$_{1-N}$, the image processing system may proceed to step 1610. At step 1610, the image processing system may perform ray tracing for the current frame and render the frame based on the current partition-workload manager assignments.

After rendering the frame (or during the rendering of the frame), the image processing system may proceed to step 1615 where the image processing system may determine the workload presented to the workload managers. The image processing system may determine the workload presented to the workload managers 205$_{1-N}$ by monitoring various performance parameters. For example, the workload presented to the workload managers 205$_{1-N}$ may be determined by examining a performance counter for a workload manager 205. A performance counter may compile data relating to performance events within a processing element (e.g., number of reads or writes executed by a workload manager). The workload present to the workload managers 205 may also be determined monitoring the traffic through the inboxes 115 corresponding to a workload manager 205.

Once the image processing system has gathered enough information to determine the workload being experienced by each workload manager 205$_{1-N}$ based on the current partitioning, the image processing system may proceed to step 1620. At step 1620, the image processing system may determine if workload is evenly distributed amongst the workload managers 205$_{1-N}$ present in the image processing system. This determination may reflect if the current partitioning of the spatial index evenly distributes workload, or if the workload is unevenly distributed and the spatial index 500 needs to be re-partitioned in order to evenly distribute workload.

For example, if one workload manager 205 is experiencing a high workload, but another workload manager 205 is experiencing a low workload the image processing system may determine at step 1620 that the spatial index 500 should be re-partitioned in order to evenly redistribute the workload amongst the workload managers 205$_{1-N}$.

If the image processing system determines that the workload is evenly distributed amongst the workload managers, the image processing system may return to step 1610 where the image processing system may perform ray tracing in order to render the next frame.

However, if the image processing system determines that the workload is unevenly distributed, the image processing system may proceed to step 1630 to re-partition the spatial index in an attempt to evenly distribute the workload amongst the various workload managers. The image processing system may re-partition the spatial index based on the information gathered in step 1615 relating to the workload experienced by the workload managers.

For example, the image processing system may use the partitioned spatial index 500 illustrated in FIG. 5 to perform ray tracing. The image processing system may monitor the performance of the workload managers (i.e., WM$_{1-4}$) in step 1615. Furthermore, in step 1620 the image processing system may determine, based on the information collected in step 1615, that WM$_1$ and WM$_4$ experience an increased or larger workload relative to WM$_2$ and WM$_3$.

In response the to the uneven workload distribution detected in step 1620, the image processing system may proceed to step 1630 where the image processing system may re-partition the spatial index based on the unevenly distributed workloads detected in step 1620. As will be described further below with respect to FIG. 18, the image processing system may re-partition the spatial index by redefining where in the spatial index 500 the partitioning lines may be located.

Figure 17:
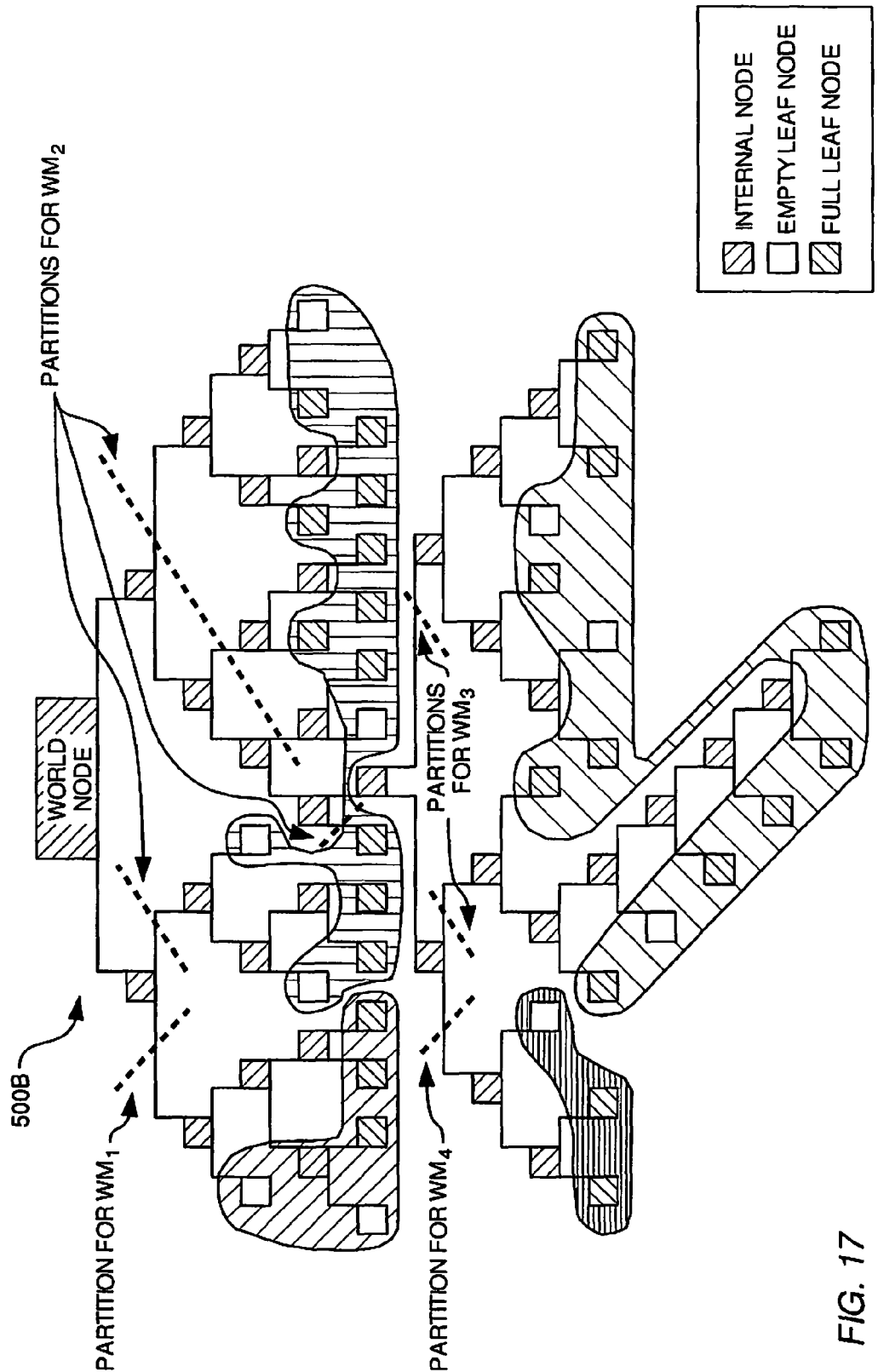

FIG. 17 illustrates an exemplary re-partitioned spatial index 500B, according to one embodiment of the invention. In response to the increased workloads detected in step 1620, the image processing system has reallocated the number of nodes which each workload manager is responsible. In response to the increased workloads experienced by $WM_1$ and $WM_4$, the number of nodes for which $WM_1$ and $WM_4$ are responsible for traversing have been reduced from 17 and 19 respectively as illustrated in the partitioned spatial index 500 of FIG. 5, to 9 and 5 respectively (as illustrated in the re-partitioned spatial index 500B of FIG. 17). Furthermore, in response to the decreased workloads experienced by $WM_2$ and $WM_3$, the number of nodes which $WM_2$ and $WM_3$ are responsible for traversing have been increased from 17 and 12 respectively as illustrated in the partitioned spatial index 500 of FIG. 5, to 25 and 24 respectively as illustrated in the re-partitioned spatial index 500B of FIG. 17. While the number of leaf nodes may be relatively uneven between workload managers after re-partitioning the spatial index, the workload experienced by the workload managers may be even.

Due to the re-partitioning, the number of leaf nodes for which each workload manager is responsible may change as well. For example, before the re-partitioning, $WM_1$ and $WM_4$ were responsible for traversing 9 and 10 leaf nodes respectively, as illustrated by the curved shaded areas in the partitioned spatial index of FIG. 5. However, after the repartitioning, $WM_1$ and $WM_4$ are responsible for traversing 6 and 3 leaf nodes respectively, as illustrated by the curved shaded areas in the repartitioned spatial index 500B of FIG. 17. The reduction in the number of leaf nodes for which $WM_1$ and $WM_4$ are responsible may decrease the workload experienced by $WM_1$ and $WM_4$. Furthermore, the number of leaf nodes which $WM_2$ and $WM_3$ are responsible has increased from 10 and 7 respectively as illustrated by the curved shaded areas in FIG. 5, to 15 and 13 as illustrated by the curved shaded areas in FIG. 17. The increase number of leaf nodes for which $WM_2$ and $WM_3$ may increase the workload experienced by $WM_1$ and $WM_4$.

By re-partitioning the spatial index 500, workload may be evenly re-distributed amongst the workload managers $205_{1-N}$ present in the image processing system. Even workload distribution may improve the overall performance of the image processing system by reducing the amount of time necessary to render a two dimensional image from a three dimensional scene.

Updating the Location of Partitioning Lines within Spatial Index

For some embodiments, partitioning line information may be stored within the information which defines the spatial index. However, in some circumstances it may be desirable to store the information defining partitioning lines separately from the information which defines the spatial index. For example, a spatial index may contain hundreds of thousands if not millions of nodes and updating the spatial index due to changes in partitioning lines may require the entire spatial index to be rewritten. Rewriting the spatial index may require a significant amount of time and thus may reduce the overall performance of a ray tracing image processing system.

According to one embodiment of the invention, a partitioning line table may be used to define where the partitioning lines are located within the spatial index 500. A workload manager traversing a ray through a spatial index may use the partitioning line table to determine if the ray needs to be sent (e.g., via the inboxes or the high speed bus 225) to a different workload manager such that the different workload manger may finish traversing the ray through the spatial index 500.

According to one embodiment of the invention, the partitioning line table may be stored separately from the spatial index 500. The partitioning line table may be stored, for example, in a processor cache 110. Storage of a partitioning line table separately from the spatial index 500 may enable updates the partitioning lines (e.g., due to workload re-distribution) without the need for modification to the spatial index 500 itself. Thus, updating a dedicated partitioning line table may allow for faster, more efficient, re-partitioning than updating the entire spatial index.

Figure 18:
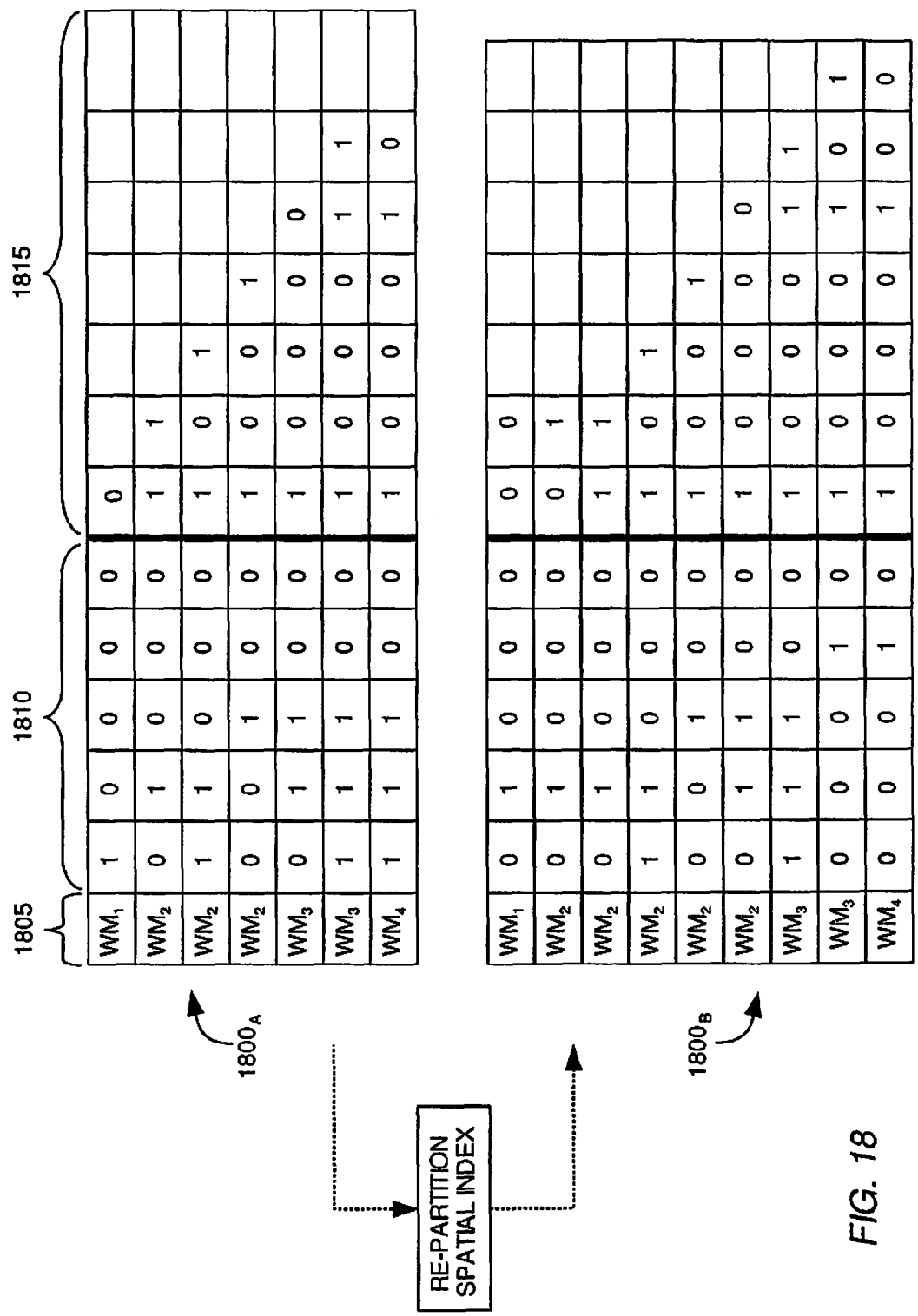
FIG. 18 is an exemplary table which may be used to determine a workload manager which is responsible for traversing a partition of a spatial index, according to one embodiment of the invention.

FIG. 18 illustrates two exemplary partitioning line tables $1800_{A-B}$ which may be used to define the location of partitioning lines within the spatial index 500. The tables may have rows which indicate where in the spatial index a partition for a specific workload manager 205 begins. The tables may also have columns which indicate which workload manager 205 the partitioning line corresponds to, how deep within the spatial index the partitioning line is located, and a map of how to get to the partitioning line.

For example, table $1800_A$ corresponds to the spatial index 500 illustrated in FIG. 5. As illustrated in FIG. 18, the first section of bits in each row of the partitioning line tables $1800_{A-B}$ are workload manager identification bits 1805. The workload manager identification bits 1805 may identify to which workload manager 205 the partitioning line corresponds.

After the workload manager identification bits 1805, the next set of bits in the partition line tables $1800_{A-B}$ may be branch level depth bits 1810. The branch level depth bits 1810 may identify how deep within the spatial index 500 the branch level which contains the partitioning line is located. For example, as illustrated in FIG. 18, five branch level depth bits 1810 are used with respect to the spatial index 500. However, although illustrated as only requiring five bits to identify the branch level depth, it should be understood by those skilled in the art that embodiments of the invention may include more or less bits to identify the branch level depth within a larger or smaller spatial index.

After the branch level depth bits 1810, the next set of bits within the partition line tables $1800_{A-B}$ may be a series of bits which in order construct a map to the branch where the partitioning line is located. These bits may collectively be referred to as map bits 1815. A zero for a map bit may indicate that a left branch may be taken from the previous node in order to traverse to or towards the branch which contains the partitioning line. A one for a map bit may indicate that a right branch may be taken from the previous node in order to traverse to or towards the branch which contains the partitioning line.

A workload manager 205 traversing a ray through a spatial index may use the information within the partitioning line tables $1800_{A-B}$ to determine where in the spatial index 500 a partitioning line exists and the ray may be sent to another workload manager 205 in order to finish the traversal through the spatial index. A workload manager 205 may do this by comparing its progress as it traverses a ray through the spatial index 500 (e.g., maintained as a set of bits indicating branches taken) with a partitioning line table to determine if it needs to send the ray to another workload manager 205. If the traversal progress of the ray matches a row entry in the partitioning line table, the workload manager has encountered a partitioning line and may send the ray (e.g., information defining the ray) to a different workload manager 205 according to the workload manager identification bits 1805 in the matched row.

However, if the workload manger 205 which initiates the traversal of the ray through the spatial index 500 never matches a ray's progress with an entry in the partitioning line table, the workload manager 205 may continue to traverse the ray through the spatial index 500 until a leaf node is reached.

For example, as illustrated in FIG. 5 the partitioning line for $WM_1$ is located on the first branch level below and to the left of the world node. The first row in the partitioning line table $1800_A$ corresponds to $WM_1$ as indicated by the workload manager identification bits 1805. Next, assuming the left most bits are the least significant bits, the binary value stored in the branch level depth bits 1810 (i.e., 10000) when converted into decimal (i.e., $2^0=1$) indicates that the partitioning line corresponding to $WM_1$ is located on the first branch level of the spatial index. Furthermore, since the map bits 1815 indicate that the left branch be taken from the world node (i.e., 0 value indicates take left branch), and the branch level dept bits 1810 indicate that the partitioning line is on the first branch level of the spatial index, a workload manager which traverses a ray to that point of the spatial index may send the ray to $WM_1$ as indicated by the workload manger identification bits 1805. The remaining entries in the partition line table $1800_A$ correspond to the other partitioning lines located in the spatial index 500 of FIG. 5.

For example, the final row of the partitioning line table $1800_A$ indicates that a partitioning line exists for $WM_4$ within the spatial index 500. The partitioning line table $1800_A$ also indicates that the partitioning line for $WM_4$ is located on the seventh branch level of the spatial index 500 as indicated by the workload manager identification bits 1805 in the row of the partitioning line table $1800_A$ corresponding to $WM_4$. Furthermore, the map bits 1815 corresponding to $WM_4$ indicate the path a workload manager traversing the spatial index with a ray to encounter the partitioning line for $WM_4$.

The map bits 1815 indicate that a workload manager must have taken a first branch down and to the right from the world node (as identified by the '1' in the least significant map bit location), then a branch down and to the left (as identified by the '0' in the second map bit location), then another branch down and to the left (as identified by the '0' in the third map bit location), then another branch down and to the left (as identified by the '0' in the fourth map bit location), then a branch down and to the right (as identified by the '1' in the fifth map bit location), and finally a branch down and to the left (as identified by the '0' in the sixth map bit location). This path would place the workload manager at the partitioning line for $WM_4$ as illustrated in FIG. 5.

When a spatial index 500 is re-partitioned (e.g., as described above with reference to FIG. 17) in an effort to evenly re-distribute workload amongst the workload managers $205_{1-N}$ present in an image processing system, the partition line table $1800_A$ may be updated to reflect the re-partitioning of the spatial index 500. For example, as stated above partitioning line table $1800_A$ corresponds to the partitioning lines located throughout the spatial index 500 illustrated in FIG. 5. In contrast, FIG. 17 illustrates the re-partitioned of spatial index 500B which may more evenly re-distribute workload amongst workload managers $205_{1-N}$. The image processing system may update the partitioning line table $1800_A$ in order to reflect the changes in the position of the partitioning lines between FIG. 5 and FIG. 17. For example, new partitioning line table $1800_B$ indicates the positions of the partitioning lines located throughout the re-partitioned spatial index 500B illustrated in FIG. 17. In this example, the partition for $WM_4$ moved down one level and to the left, as indicated by an additional '0' map bit in the row corresponding to $WM_4$ in the new partitioning line table $1800_B$.

By modifying the partitioning line table $1800_A$ in response to the re-partitioning of a spatial index, workload managers may be able to determine the location or locations of partitions within the re-partitioned spatial index by referring to a modified partitioning line table $1800_B$. Furthermore, by storing information defining the partitioning lines within partitioning line tables $1800_{A-B}$ stored separately from the spatial index, and using the partitioning line tables $1800_{A-B}$ to determine the position of the partition lines within the spatial index, only the partitioning line tables $1800_{A-B}$ may need to be updated in response to a re-partitioning of the spatial index rather than modifying the spatial index itself.

CONCLUSION

In conclusion, an image processing system may perform various tasks in an effort to evenly distribute workload amongst workload managers. According to one embodiment of the invention, the image processing system may divide a frame of pixels into different regions and assign responsibility for the regions to different workload managers in order to evenly distribute workload. The workload managers may be responsible for performing operations relating to determining or maintaining the color of the pixel within the region or regions which they are responsible. According to another embodiment of the invention, the image processing system may re-divide the frame into new regions based on relative workloads experienced by the processing elements to evenly distribute workload. Furthermore, according to another embodiment of the invention, the image processing system may re-partition a spatial index based on relative workloads experienced by the processing elements to evenly distribute workload amongst workload managers.

While the foregoing is directed to embodiments of the present invention, other and further embodiments of the invention may be devised without departing from the basic scope thereof, and the scope thereof is determined by the claims that follow.

What is claimed is:

1. A method for distributing workload in a ray tracing image processing system, the method comprising:
   dividing a two-dimensional frame of pixels into at least a first region of pixels and a second region of pixels, wherein the two-dimensional frame of pixels represents an image rendered from a three-dimensional scene;
   partitioning a spatial index, wherein the spatial index represents the three-dimensional scene;
   assigning to a first processing element a responsibility for initiating ray tracing for rays that traverse through the first region of pixels;
   assigning to a second processing element a responsibility for initiating ray tracing for rays that traverse through the second region of pixels;
   performing ray tracing with the first processing element and the second processing element to determine colors of pixels in the two-dimensional frame of pixels;
   monitoring at least one of a workload experienced by the first processing element and a workload experienced by the second processing element;
   re-dividing the two-dimensional frame of pixels into at least a new first region of pixels and a new second region of pixels based on at least one of the workload experienced by the first processing element and the workload experienced by the second processing element; and
   re-partitioning the spatial index based on at least one of the workload experienced by the first processing element and the workload experienced by the second processing element.

2. The method of claim 1, further comprising:
   assigning to the first processing element a responsibility for maintaining colors of pixels located within the new first region of pixels; and assigning to the second processing element a responsibility for maintaining colors of pixels located within the new second region of pixels.

3. The method of claim 1, wherein the size of at least one of the new first region of pixels and the new second region of pixels is based on at least one of the workload experienced by the first processing element and the workload experienced by the second processing element.

4. The method of claim 1, wherein re-dividing the two-dimensional frame of pixels into at least a new first region of pixels and a new second region of pixels comprises:
   upon determining that the workload experienced by the first processing element is greater than the workload experienced by the second processing element, re-dividing the two-dimensional frame of pixels such that the new first region of pixels is smaller than the new second region of pixels; and
   upon determining that the workload experienced by the second processing element is greater than the workload experienced by the first processing element, re-dividing the two-dimensional frame of pixels such that the new second region of pixels is smaller than the new first region of pixels.

5. The method of claim 1, wherein monitoring a workload comprises monitoring a performance counter for at least one of the first processing element and the second processing element.

6. The method of claim 1, wherein monitoring a workload comprises monitoring an inbox associated with at least one of the first processing element and the second processing element.

7. The method of claim 1, wherein the first processing element is located on a first processing core and the second processing element is located on a second processing core.

8. The method of claim 1, further comprising:
   assigning to the first processing element a responsibility for initiating ray tracing for rays that traverse through the new first region of pixels; and
   assigning to the second processing element a responsibility for initiating ray tracing for rays that traverse through the new second region of pixels.

9. The method of claim 1, wherein the spatial index is implemented as a tree type data structure.

10. A non-transitory computer readable storage medium containing a program which, when executed, performs operations comprising:
   dividing a two-dimensional frame of pixels into at least a first region of pixels and a second region of pixels, wherein the two-dimensional frame of pixels represents an image rendered from a three-dimensional scene;
   partitioning a spatial index, wherein the spatial index represents the three-dimensional scene;
   assigning to a first processing element a responsibility for initiating ray tracing for rays that traverse through the first region of pixels;
   assigning to a second processing element a responsibility for initiating ray tracing for rays that traverse through the second region of pixels;
   performing ray tracing with the first processing element and the second processing element to determine colors of pixels in the two-dimensional frame of pixels;
   monitoring at least one of a workload experienced by the first processing element and a workload experienced by the second processing element;
   re-dividing the two-dimensional frame of pixels into at least a new first region of pixels and a new second region of pixels based on at least one of the workload experienced by the first processing element and the workload experienced by the second processing element; and
   re-partitioning the spatial index based on at least one of the workload experienced by the first processing element and the workload experienced by the second processing element.

11. The computer readable storage medium of claim 10, wherein re-dividing the two-dimensional frame of pixels into at least a new first region of pixels and a new second region of pixels comprises:
   upon determining that the workload experienced by the first processing element is greater than the workload experienced by the second processing element, re-dividing the two-dimensional frame of pixels such that the new first region of pixels is smaller than the new second region of pixels; and
   upon determining that the workload experienced by the second processing element is greater than the workload experienced by the first processing element, re-dividing the two-dimensional frame of pixels such that the new second region of pixels is smaller than the new first region of pixels.

12. The computer readable storage medium of claim 10 wherein monitoring a workload comprises monitoring a performance counter for at least one of the first processing element and the second processing element.

13. The computer readable storage medium of claim 10, wherein monitoring a workload comprises monitoring an inbox associated with at least one of the first processing element and the second processing element.

14. The computer readable storage medium of claim 10, wherein the operations further comprise:
   assigning to the first processing element a responsibility for initiating ray tracing for rays that traverse through the new first region of pixels; and
   assigning to the second processing element a responsibility for initiating ray tracing for rays that traverse through the new second region of pixels.

15. The computer readable storage medium of claim 10, wherein the spatial index is implemented as a tree type data structure.

16. The computer readable storage medium of claim 10, wherein the size of at least one of the new first region of pixels and the new second region of pixels is based on at least one of the workload experienced by the first processing element and the workload experienced by the second processing element.

17. An image processing system comprising:
   a first processing element; and
   a second processing element,
   wherein the image processing system is configured to:
      divide a two-dimensional frame of pixels into at least a first region of pixels and a second region of pixels, wherein the two-dimensional frame of pixels represents an image rendered from a three-dimensional scene,
      partition a spatial index, wherein the spatial index represents the three-dimensional scene,
      assign to the first processing element a responsibility for initiating ray tracing for rays that traverse through the first region of pixels,
      assign to the second processing element a responsibility for initiating ray tracing for rays that traverse through the second region of pixels,
      perform ray tracing with the first processing element and the second processing element to determine colors of pixels in the two-dimensional frame of pixels, monitor at least one of a workload experienced by the first processing element and a workload experienced by the second processing element, re-divide the two-dimensional frame of pixels into at least a new first region of pixels and a new second region of pixels based on at least one of the workload experienced by the first processing element and the workload experienced by the second processing element, and re-partition the spatial index based on at least one of the workload experienced by the first processing element and the workload experienced by the second processing element.

18. The image processing system of claim 17, wherein the image processing system is further configured to:

assign to the first processing element a responsibility for maintaining colors of pixels located within the new first region of pixels, and assign to the second processing element a responsibility for maintaining colors of pixels located within the new second region of pixels.

19. The image processing system of claim 17, wherein the size of at least one of the new first region of pixels and the new second region of pixels is based on at least one of the workload experienced by the first processing element and the workload experienced by the second processing element.

20. The image processing system of claim 17, wherein re-dividing the two-dimensional frame of pixels into at least a new first region of pixels and a new second region of pixels comprises:

upon determining that the workload experienced by the first processing element is greater than the workload experienced by the second processing element, re-dividing the two-dimensional frame of pixels such that the new first region of pixels is smaller than the new second region of pixels; and upon determining that the workload experienced by the second processing element is greater than the workload experienced by the first processing element, re-dividing the two-dimensional frame of pixels such that the new second region of pixels is smaller than the new first region of pixels.

21. The image processing system of claim 17, wherein monitoring the workload comprises monitoring a performance counter for at least one of the first processing element and the second processing element.

22. The image processing system of claim 17, wherein monitoring the workload comprises monitoring an inbox associated with at least one of the first processing element and the second processing element.

23. The image processing system of claim 17, further comprising:

a first processing core; and a second processing core, wherein the first processing element is located on the first processing core and the second processing element is located on the second processing core.

24. The image processing system of claim 17, wherein the image processing system is further configured to:

assign to the first processing element a responsibility for initiating ray tracing for rays that traverse through the new first region of pixels, and assign to the second processing element a responsibility for initiating ray tracing for rays that traverse through the new second region of pixels.

25. The image processing system of claim 17, wherein the spatial index is implemented as a tree type data structure.

* * * * *